United States Patent
Zhang

(10) Patent No.: US 11,595,857 B2
(45) Date of Patent: Feb. 28, 2023

(54) METHOD AND DEVICE IN UE AND BASE STATION USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 311 days.

(21) Appl. No.: 16/941,525

(22) Filed: Jul. 28, 2020

(65) Prior Publication Data

US 2020/0359270 A1    Nov. 12, 2020

Related U.S. Application Data

(63) Continuation of application No. PCT/CN2019/074130, filed on Jan. 31, 2019.

(30) Foreign Application Priority Data

Feb. 6, 2018  (CN) .......................... 201810115784.0

(51) Int. Cl.
*H04W 28/26* (2009.01)
*H04W 72/04* (2023.01)
(Continued)

(52) U.S. Cl.
CPC ......... *H04W 28/26* (2013.01); *H04W 72/042* (2013.01); *H04W 72/0446* (2013.01); *H04W 72/0453* (2013.01)

(58) Field of Classification Search
CPC ............... H04W 28/26; H04W 72/042; H04W 72/0446; H04W 72/0453; H04L 5/0007; H04B 7/0617
See application file for complete search history.

(56) References Cited

U.S. PATENT DOCUMENTS

| | | | |
|---|---|---|---|
| 2009/0253447 A1* | 10/2009 | Pi ..................... | H04L 5/0053 455/501 |
| 2012/0058791 A1* | 3/2012 | Bhattad ............... | H04L 5/0053 455/509 |

(Continued)

FOREIGN PATENT DOCUMENTS

| | | |
|---|---|---|
| CN | 104412645 A | 3/2015 |
| CN | 105636233 A | 6/2016 |

(Continued)

OTHER PUBLICATIONS

ISR in application No. PCT/CN2019/074130 dated Mar. 27, 2019.

(Continued)

*Primary Examiner* — Christine Ng

(57) ABSTRACT

The present disclosure provides a method and device in a User Equipment (UE) and a base station used for wireless communications. The UE receives first information, the first information being used to indicate a first time-domain resource and a second time-domain resource in a first sub-band, wherein the first time-domain resource is reserved for a first radio signal; performs a first access detection to determine whether to transmit the first radio signal on the first time-domain resource in the first sub-band; and transmits the first radio signal on the first time-domain resource in the first sub-band, and does not transmit any radio signal on a reserved time-domain resource in the first sub-band; or, the UE drops transmitting the first radio signal on the first time-domain resource in the first sub-band. The reserved time-domain resource is located between the first time-domain resource and the second time-domain resource in time domain.

20 Claims, 18 Drawing Sheets

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2013/0010744 A1* | 1/2013 | Kang | H04B 7/0623 |
| | | | 370/329 |
| 2017/0034845 A1* | 2/2017 | Liu | H04W 28/0289 |
| 2017/0099164 A1* | 4/2017 | Jiang | H04L 25/03 |
| 2017/0142746 A1 | 5/2017 | Koorapaty et al. | |
| 2017/0257865 A1 | 9/2017 | Halabian et al. | |
| 2018/0063858 A1* | 3/2018 | Au | H04L 5/0048 |
| 2019/0296819 A1* | 9/2019 | Jiang | H04B 7/0697 |

FOREIGN PATENT DOCUMENTS

| | | |
|---|---|---|
| CN | 107040342 A | 8/2017 |
| CN | 107079464 A | 8/2017 |
| WO | 2017110961 A | 6/2017 |

OTHER PUBLICATIONS

CN Search Report in application No. 201810115784.0 dated Dec. 25, 2019.
CN First Office Action in application No. 201810115784.0 dated Jan. 3, 2020.
CATT."Design of Floating TTI for LAA DL"3GPPTSG RAN WG1 Meeting #82bis R1-155196, (Oct. 9, 2015).
CN Notice of Allowance in application No. 201810115784.0 May 8, 2020.

\* cited by examiner

Transmitting beam of first given antenna port group

Transmitting beam of second given antenna port group

Transmitting beam of first given antenna port group

Transmitting beam of second given antenna port group

○ Transmitting beam of first given antenna port group

⟨⟩ Transmitting beam of second given antenna port group

Transmitting beam of first given antenna port group

⟨⟩ Transmitting beam of second given antenna port group

Transmitting beam of given antenna port

Receiving beam employed by given energy detection

Transmitting beam of given antenna port

Receiving beam employed by given energy detection

Receiving beam employed by second given energy detection

Receiving beam employed by first given energy detection

Receiving beam employed by second given energy detection

Receiving beam employed by first given energy detection

METHOD AND DEVICE IN UE AND BASE STATION USED FOR WIRELESS COMMUNICATION

CROSS REFERENCE TO RELATED APPLICATIONS

This application is a continuation of International Application No. PCT/CN2019/074130, filed Jan. 31, 2019, claims the priority benefit of Chinese Patent Application No. 201810115784.0, filed on Feb. 6, 2018, the full disclosure of which is incorporated herein by reference.

BACKGROUND

Technical Field

The present disclosure relates to transmission methods and devices in wireless communication systems, and in particular to a communication scheme and device that support data transmission on Unlicensed Spectrum.

Related Art

In a traditional 3rd Generation Partner Project (3GPP) Long-term Evolution (LTE) system, data transmission only occurs on Licensed Spectrum. However, as traffic flow began to skyrocket, particularly in some urban areas, the Licensed Spectrum may hardly meet growing demands for traffic, therefore, in Release 13 and Release 14 communications on Unlicensed Spectrum is introduced into a cellular system and used for downlink and uplink data transmissions. To ensure compatibility with other access technologies on Unlicensed Spectrum, the technique of Listen Before Talk (LBT) is adopted by Licensed Assisted Access (LAA) so as to prevent interference caused by multiple transmitters occupying a same frequency resource at the same time. A transmitter in LTE system adopts quasi-omnidirectional antennas in performing LBT.

Due to the limitations of hardware size, implementation cost and complexity, a User Equipment (UE) may be equipped with fewer transmission Radio Frequency (RF) channels than reception RF channels, so that the UE is required to send SRS to assist a base station in acquiring complete downlink channel information, which can be implemented through antenna switching. The technique of antenna switching has been adopted by standards of 5G New Radio (NR) Access Technology.

At present, technical discussions about 5G New Radio (NR) are in progress, which include access to Unlicensed Spectrum, a new hot topic of study on next generation mobile communications. In the study of access of Unlicensed Spectrum, omnidirectional LBT and beam-based LBT are two major potential techniques. Besides, the traditional technology of LAA needs to reconsider the influence of some 5G NR properties, such as antenna switching.

SUMMARY

Inventors find through researches that massive MIMO will be widely applied in NR systems, so how to acquire precise channel information and improve system capacity becomes a key issue that needs to be solved.

To address the above problem, the present disclosure proposes a solution. It should be noted that the embodiments of the present disclosure and the characteristics in the embodiments may be mutually combined if no conflict is incurred.

The present disclosure provides a method in a User Equipment (UE) for wireless communications, comprising:
receiving first information, the first information being used to indicate a first time-domain resource and a second time-domain resource in a first sub-band, wherein the first time-domain resource is reserved for a first radio signal, and the second time-domain resource is reserved for a second radio signal;
performing a first access detection to determine whether to transmit the first radio signal on the first time-domain resource in the first sub-band; and
transmitting the first radio signal on the first time-domain resource in the first sub-band, and not transmitting any radio signal on a reserved time-domain resource in the first sub-band; or, dropping transmission of the first radio signal on the first time-domain resource in the first sub-band, and transmitting a first target radio signal on the reserved time-domain resource in the first sub-band;
herein, the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, a problem that needs solving in the present disclosure is that: in NR system, sufficient multicarrier symbols may need to be reserved between the two uplink radio signals for transmission antenna switching, since LBT, no matter it is omnidirectional or beam-based, may lead to a situation where one of the pre-configured uplink radio signals fails to be transmitted, so that multicarrier symbols reserved for the uplink radio signal not transmitted and for antenna switching cannot be adequately utilized, thereby causing wastes of resources and affecting the system capacity.

In one embodiment, the essence of the above method lies in that measurements on two uplink reference signals are used to assist the base station in acquiring complete downlink channel information. In Unlicensed Spectrum only when LBTs corresponding to the two reference signals are passed, whether omnidirectional or beam-based, these two reference signals can both be transmitted, and then the base station is able to acquire complete channel information. However, if one reference signal cannot be transmitted due to LBT failure, multicarrier symbols reserved for the reference signal may be considered for use in antenna switching. The method is advantageous in that if multicarrier symbols originally reserved for antenna switching are used for repeated transmission of the other reference signal, the precision of channel estimation of the other reference signal may be enhanced; or if multicarrier symbols originally reserved for antenna switching are used for transmitting other radio signals such as data, control information or other reference signals, resources for uplink transmission will be increased, thus improving the system capacity.

In one embodiment, the essence of the above method lies in that if a reserved time-domain resource is requested between two uplink radio signals for switching transmission antennas, the two uplink radio signals can be transmitted only when corresponding LBTs are passed in Unlicensed Spectrum, no matter the LBTs are omnidirectional or based on beams. But if one of the two uplink radio signals is not transmitted because of a failed LBT, then multicarrier symbols reserved for the not-transmitted uplink radio signal will be considered to be used for antenna switching, while multicarrier symbols reserved for antenna switching may be used for a repetition of transmission of the other uplink radio signal, which is beneficial to increasing the receiving power of the other uplink radio signal and the chance of successful transmission; or multicarrier symbols originally reserved for the antenna switching may be used for transmitting other uplink radio signals such as data, control information or reference signals, hence an increase in resources for uplink transmission, and system capacity as well.

According to one aspect of the present disclosure, the above method is characterized in comprising:

performing a first target access detection;

herein, the first target access detection is used to determine whether to transmit the first target radio signal on the reserved time-domain resource in the first sub-band, and an end time of the first target access detection is earlier than a start time of the reserved time-domain resource.

According to one aspect of the present disclosure, the above method is characterized in comprising:

transmitting the second radio signal on the second time-domain resource in the first sub-band; or, dropping transmission of the second radio signal on the second time-domain resource in the first sub-band.

According to one aspect of the present disclosure, the above method is characterized in comprising:

transmitting a second target radio signal on the first time-domain resource in the first sub-band; and dropping transmitting the second radio signal on the second time-domain resource in the first sub-band;

herein, the first time-domain resource is earlier than the second time-domain resource, the UE drops transmitting the first radio signal on the first time-domain resource in the first sub-band, and transmits the first target radio signal on the reserved time-domain resource in the first sub-band.

In one embodiment, the essence of the above method lies in that when one of two uplink radio signals cannot be transmitted due to a failed LBT, whether omnidirectional or beam-based, multicarrier symbols reserved for the uplink radio signal not transmitted will be used for transmitting another uplink radio signal, and multicarrier symbols originally reserved for antenna switching are also used for transmitting an uplink radio signal other than the above two uplink radio signals, as a result, no time-domain resource is left for switching transmission antennas, so the other of the two uplink radio signal cannot be transmitted, either, no matter whether corresponding LBT has passed. An advantage of the above method is that a first time-domain resource, a reserved time-domain resource and even a second time-domain resource can be used for transmitting other uplink radio signals.

According to one aspect of the present disclosure, the above method is characterized in comprising:

receiving second information;

herein, the second information is used to indicate configuration information of the first target radio signal.

According to one aspect of the present disclosure, the above method is characterized in comprising:

receiving third information;

herein, the third information is used to indicate configuration information of the second target radio signal.

According to one aspect of the present disclosure, the above method is characterized in comprising:

receiving fourth information;

herein, the fourth information is used to indicate configuration information of the first radio signal and configuration information of the second radio signal.

The present disclosure provides a method in a base station for wireless communications, comprising:

transmitting first information, the first information being used to indicate a first time-domain resource and a second time-domain resource in a first sub-band, wherein the first time-domain resource is reserved for a first radio signal, and the second time-domain resource is reserved for a second radio signal;

monitoring the first radio signal on the first time-domain resource in the first sub-band to determine whether the first radio signal is transmitted on the first time-domain resource in the first sub-band; and receiving the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and receiving a first target radio signal on the reserved time-domain resource in the first sub-band;

herein, a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

According to one aspect of the present disclosure, the above method is characterized in comprising:

monitoring the first target radio signal on the reserved time-domain resource in the first sub-band to determine whether the first target radio signal is transmitted on the reserved time-domain resource in the first sub-band;

herein, a first target access detection performed is used to determine whether to transmit the first target radio signal on the reserved time-domain resource in the first sub-band, and an end time of the first target access detection is earlier than a start time of the reserved time-domain resource.

According to one aspect of the present disclosure, the above method is characterized in comprising:

monitoring the second radio signal on the second time-domain resource in the first sub-band to determine whether the second radio signal is transmitted on the second time-domain resource in the first sub-band;

when the second radio signal is transmitted on the second time-domain resource in the first sub-band, the second radio signal is received on the second time-domain resource in the first sub-band.

According to one aspect of the present disclosure, the above method is characterized in comprising:

receiving a second target radio signal on the first time-domain resource in the first sub-band;

herein, the first time-domain resource is earlier than the second time-domain resource, the first radio signal is transmitted on the first time-domain resource in the first sub-band, the first target radio signal is transmitted on the reserved time-domain resource in the first sub-band, and the second radio signal is not transmitted on the second time-domain resource in the first sub-band.

According to one aspect of the present disclosure, the above method is characterized in comprising:

transmitting second information;

herein, the second information is used to indicate configuration information of the first target radio signal.

According to one aspect of the present disclosure, the above method is characterized in comprising:

transmitting third information;

herein, the third information is used to indicate configuration information of the second target radio signal.

According to one aspect of the present disclosure, the above method is characterized in comprising:

transmitting fourth information;

herein, the fourth information is used to indicate configuration information of the first radio signal and configuration information of the second radio signal.

The present disclosure provides a User Equipment (UE) for wireless communications, comprising:

a first receiver, which receives first information, the first information being used to indicate a first time-domain resource and a second time-domain resource in a first sub-band, wherein the first time-domain resource is reserved for a first radio signal, and the second time-domain resource is reserved for a second radio signal;

a first transceiver, which performs a first access detection to determine whether to transmit the first radio signal on the first time-domain resource in the first sub-band; and which transmits the first radio signal on the first time-domain resource in the first sub-band, and does not transmit any radio signal on a reserved time-domain resource in the first sub-band; or, which drops transmitting the first radio signal on the first time-domain resource in the first sub-band, and transmits a first target radio signal on the reserved time-domain resource in the first sub-band;

herein, the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the above UE is characterized in that the first transceiver also performs a first target access detection; herein, the first target access detection is used to determine whether to transmit the first target radio signal on the reserved time-domain resource in the first sub-band, and an end time of the first target access detection is earlier than a start time of the reserved time-domain resource.

In one embodiment, the above UE is characterized in that the first transceiver also transmits the second radio signal on the second time-domain resource in the first sub-band; or, drops transmitting the second radio signal on the second time-domain resource in the first sub-band.

In one embodiment, the above UE is characterized in that the first transceiver also transmits a second target radio signal on the first time-domain resource in the first sub-band; and drops transmitting the second radio signal on the second time-domain resource in the first sub-band; herein, the first time-domain resource is earlier than the second time-domain resource, the UE drops transmitting the first radio signal on the first time-domain resource in the first sub-band, and transmits the first target radio signal on the reserved time-domain resource in the first sub-band.

In one embodiment, the above UE is characterized in that the first receiver also receives second information; herein, the second information is used to indicate configuration information of the first target radio signal.

In one embodiment, the above UE is characterized in that the first receiver also receives third information; herein, the third information is used to indicate configuration information of the second target radio signal.

In one embodiment, the above UE is characterized in that the first receiver also receives fourth information; herein, the fourth information is used to indicate configuration information of the first radio signal and configuration information of the second radio signal.

The present disclosure provides a base station for wireless communications, comprising:

a second transmitter, which transmits first information, the first information being used to indicate a first time-domain resource and a second time-domain resource in a first sub-band, wherein the first time-domain resource is reserved for a first radio signal, and the second time-domain resource is reserved for a second radio signal;

a second receiver, which monitors the first radio signal on the first time-domain resource in the first sub-band to determine whether the first radio signal is transmitted on the first time-domain resource in the first sub-band; and receives the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and which receives a first target radio signal on the reserved time-domain resource in the first sub-band;

herein, a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the above base station is characterized in that the second receiver also monitors the first target radio signal on the reserved time-domain resource in the first sub-band to determine whether the first target radio signal is transmitted on the reserved time-domain resource in the first sub-band; herein, a first target access detection performed is used to determine whether to transmit the first target radio signal on the reserved time-domain resource in the first sub-band, and an end time of the first target access detection is earlier than a start time of the reserved time-domain resource.

In one embodiment, the above base station is characterized in that the second receiver also monitors the second radio signal on the second time-domain resource in the first sub-band to determine whether the second radio signal is transmitted on the second time-domain resource in the first sub-band; when the second radio signal is transmitted on the second time-domain resource in the first sub-band, the second receiver also receives the second radio signal on the second time-domain resource in the first sub-band.

In one embodiment, the above base station is characterized in that the second receiver also receives a second target radio signal on the first time-domain resource in the first sub-band; wherein the first time-domain resource is earlier than the second time-domain resource, the first radio signal is transmitted on the first time-domain resource in the first sub-band, the first target radio signal is transmitted on the reserved time-domain resource in the first sub-band, and the second radio signal is not transmitted on the second time-domain resource in the first sub-band.

In one embodiment, the above base station is characterized in that the second transmitter also transmits second information; herein, the second information is used to indicate configuration information of the first target radio signal.

In one embodiment, the above base station is characterized in that the second transmitter also transmits third information; wherein the third information is used to indicate configuration information of the second target radio signal.

In one embodiment, the above base station is characterized in that the second transmitter also transmits fourth information; wherein the fourth information is used to indicate configuration information of the first radio signal and configuration information of the second radio signal.

In one embodiment, the present disclosure has the following advantages over prior art:

If measurements on two uplink reference signals are used to assist the base station in acquiring complete downlink channel information, only when LBTs corresponding to the two reference signals are passed, no matter the LBTs are omnidirectional or beam-based, can the two reference signals be transmitted and the base station acquire complete channel information. However, if one of the two reference signals cannot be transmitted due to LBT failure, multicarrier symbols reserved for the reference signal may be used for antenna switching, while multicarrier symbols reserved for antenna switching may be used for a repetition of transmission of the other reference signal, therefore, more accurate channel information can be obtained from the other reference signal; or, multicarrier symbols originally reserved for antenna switching may be used for transmitting other radio signals, such as data, control information or other reference signals, thereby increasing resources for uplink transmission and improving system capacity.

If between two uplink radio signals a reserved time-domain resource is required for switching transmission antennas, in the Unlicensed Spectrum, only when LBTs corresponding to the two uplink radio signals are passed, whether omnidirectional LBTs or beam-based LBTs, these two uplink radio signals can be transmitted. If one uplink radio signal cannot be transmitted because of failed LBT, multicarrier symbols reserved for the uplink radio signal may be considered to be used for antenna switching, if multicarrier symbols originally reserved for antenna switching may be used for repeated transmission of the other uplink radio signal, the receiving power of the other uplink radio signal can be enhanced, thus improving the chance of successful transmission; or multicarrier symbols originally reserved for antenna switching may be used to transmit other uplink radio signals, such as data, control information or reference signals, hence an increase in resources for uplink transmission and an improvement in system capacity.

The proposed solution is appliable not only to omnidirectional LBT but also to beam-based LBT.

When beam-based LBT is adopted, different LBTs may employ different receiving beams in listening; multiple receiving beams correspond to multiple LBTs, and there is a one-to-one correspondence relationship between multiple LBTs and multiple radio signal transmissions; beam-based LBT can reflect the interference in a specific beam direction more truthfully and improve sharing of the Unlicensed Spectrum.

LBT beam may be selected by the transmitter flexibly based on its capabilities. And different transmitters have different capabilities, including the number of Radio Frequency channels.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
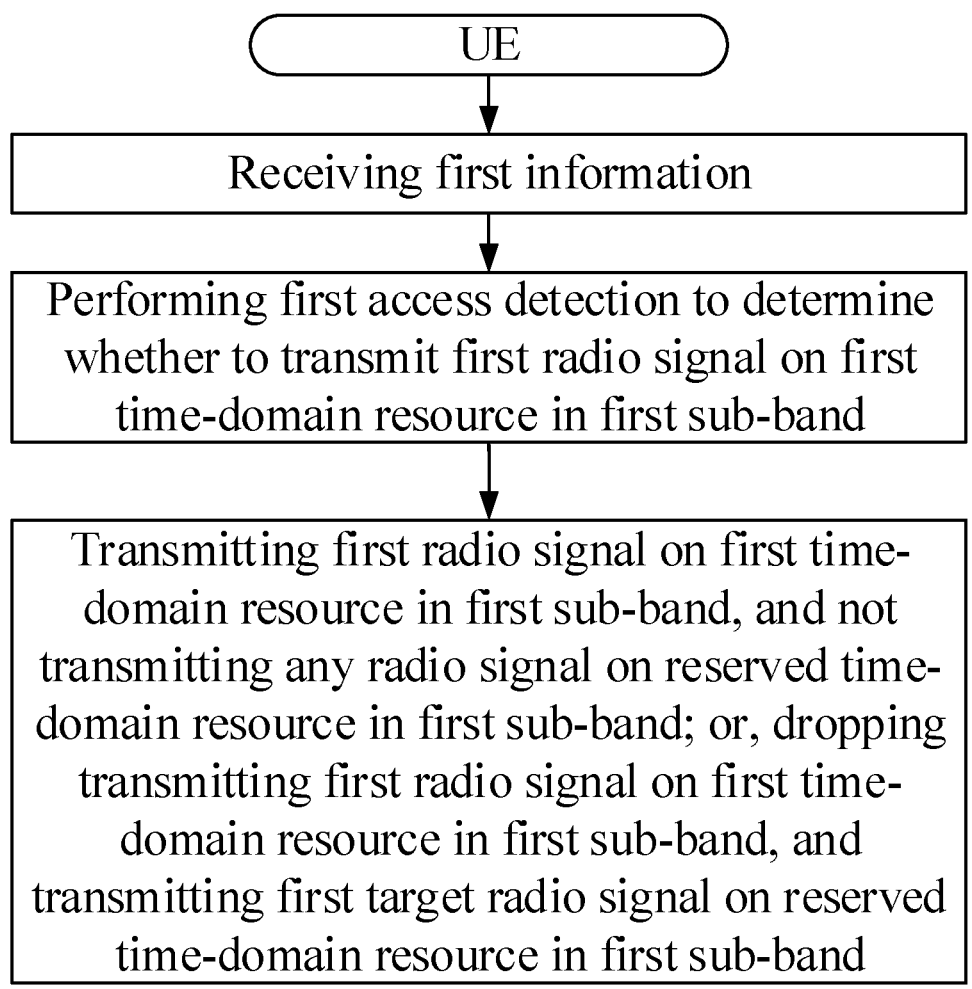
FIG. 1 illustrates a flowchart of first information, a first access detection and a first radio signal according to one embodiment of the present disclosure.

Embodiment 1 illustrates a flowchart of first information, a first access detection and a first radio signal, as shown in FIG. 1.

In Embodiment 1, the UE of the present disclosure receives first information, the first information being used to indicate a first time-domain resource and a second time-domain resource in a first sub-band, wherein the first time-domain resource is reserved for a first radio signal, and the second time-domain resource is reserved for a second radio signal; performs a first access detection to determine whether to transmit the first radio signal on the first time-domain resource in the first sub-band; and transmits the first radio signal on the first time-domain resource in the first sub-band, and does not transmit any radio signal on a reserved time-domain resource in the first sub-band; or, drops transmitting the first radio signal on the first time-domain resource in the first sub-band, and transmits a first target radio signal on the reserved time-domain resource in the first sub-band; herein, the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the first information explicitly indicates a first time-domain resource and a second time-domain resource in a first sub-band.

In one embodiment, the first information implicitly indicates a first time-domain resource and a second time-domain resource in a first sub-band.

In one embodiment, a first time-domain resource set is composed of multiple time-domain resources, and the first time-domain resource is one of the multiple time-domain resources, of which each time-domain resource is composed of a positive integer number of multicarrier symbol(s), and the first information indicates an index of the first time-domain resource in the first time-domain resource set.

In one embodiment, the first information is used to indicate configuration information of the first radio signal and configuration information of the second radio signal.

In one sub embodiment, the first information explicitly indicates configuration information of the first radio signal and configuration information of the second radio signal.

In one subembodiment, the first information implicitly indicates configuration information of the first radio signal and configuration information of the second radio signal.

In one subembodiment, the first information is semi-statically configured.

In one subembodiment, the first information is carried by a higher-layer signaling.

In one subembodiment, the configuration information of the first radio signal comprises the first time-domain resource.

In one subembodiment, the configuration information of the second radio signal comprises the second time-domain resource.

In one embodiment, the first information and the fourth information are jointly used to indicate the first time-domain resource and the second time-domain resource in the first sub-band.

In one subembodiment, the first information is dynamically configured.

In one subembodiment, the first information is carried by a physical layer signaling.

In one subembodiment, the fourth information indicates multicarrier symbols occupied by the first time-domain resource in a time-domain resource unit and multicarrier symbols occupied by the second time-domain resource in a time-domain resource unit, while the first information is used to determine a time-domain resource unit where the first time-domain resource is located and a time-domain resource unit where the second time-domain resource is located.

In one subembodiment, the fourth information indicates multicarrier symbols occupied by the first time-domain resource in a time-domain resource unit and multicarrier symbols occupied by the second time-domain resource in a time-domain resource unit, while the first information indicates a time-domain offset between a time-domain resource unit where the first time-domain resource is located and a transmission time-domain resource unit for the first information, wherein the time-domain offset is measured by the time-domain resource unit.

In one subembodiment, the fourth information indicates multicarrier symbols occupied by the first time-domain resource in a time-domain resource unit and multicarrier symbols occupied by the second time-domain resource in a time-domain resource unit, a transmission time-domain resource unit for the first information is a time-domain resource unit where the first time-domain resource and the second time-domain resource are located.

In one subembodiment, the first information is dynamically configured.

In one subembodiment, the first information is carried by a physical layer signaling.

In one embodiment, the time-domain resource unit is a slot.

In one embodiment, the time-domain resource unit is a subframe.

In one embodiment, the time-domain resource unit is a mini-slot.

In one embodiment, the time-domain resource unit is composed of a positive integer number of contiguous multicarrier symbols.

In one embodiment, the multicarrier symbol is an Orthogonal Frequency-Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multi Carrier (FBMC) symbol.

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is all or part of an Information Element (IE) in an RRC signaling.

In one embodiment, the first information is carried by a Medium Access Control (MAC) Control Element (CE) signaling.

In one embodiment, the first information is carried by a broadcast signaling.

In one embodiment, the first information is system information.

In one embodiment, the first information is transmitted in a System Information Block (SIB).

In one embodiment, the first information is dynamically configured.

In one embodiment, the first information is carried by a physical-layer signaling.

In one embodiment, the first information belongs to Downlink Control Information (DCI).

In one embodiment, the first information is aperiodic SRS trigger request.

In one embodiment, the first information belongs to DownLink Grant DCI.

In one embodiment, the first information belongs to UpLink Grant DCI.

In one embodiment, the first information is a field in a piece of DCI, wherein the field comprises a positive integer number of bit(s).

In one embodiment, the first information is composed by multiple fields in a piece of DCI, wherein each field comprises a positive integer number of bit(s).

In one embodiment, the first information is carried by a downlink physical layer control channel (i.e., a downlink channel only capable of carrying a physical layer signaling).

In one embodiment, the first information is carried by a Physical Downlink Control Channel (PDCCH).

In one embodiment, the first information is carried by a short PDCCH (sPDCCH).

In one embodiment, the first information is carried by a New Radio PDCCH (NR-PDCCH).

In one embodiment, the first information is carried by a Narrow Band PDCCH (NB-PDCCH).

In one embodiment, the first information is transmitted on a frequency band deployed on Unlicensed Spectrum.

In one embodiment, the first information is transmitted on a frequency band deployed on Licensed Spectrum.

In one embodiment, the first information is transmitted on the first sub-band.

In one embodiment, the first information is transmitted on a frequency band other than the first sub-band.

In one embodiment, the first information is transmitted on a frequency band deployed on Licensed Spectrum other than the first sub-band.

In one embodiment, the first information is transmitted on a frequency band deployed on Unlicensed Spectrum other than the first sub-band.

In one embodiment, the first information is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first information is transmitted on a downlink physical layer data channel (i.e., a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, a signaling identifier of the first information is a Cell-Radio Network Temporary Identifier (C-RNTI).

In one embodiment, the first information belongs to a piece of DCI identified by C-RNTI.

In one embodiment, C-RNTI is used to generate an RS sequence of DMRS corresponding to the first information.

In one embodiment, a CRC bit sequence of the first information is scrambled by C-RNTI.

In one embodiment, the first information belongs to a piece of UE-specific DCI.

In one embodiment, the first sub-band comprises a positive integer number of Physical Resource Block(s) (PRB).

In one embodiment, the first sub-band comprises a positive integer number of consecutive PRBs.

In one embodiment, the first sub-band comprises a positive integer number of Resource Block(s) (RB).

In one embodiment, the first sub-band comprises a positive integer number of consecutive RBs.

In one embodiment, the first sub-band comprises a positive integer number of consecutive sub carriers.

In one embodiment, a number of consecutive subcarriers comprised by the first sub-band is a positive integral multiple of 12.

In one embodiment, the first sub-band is deployed on Unlicensed Spectrum.

In one embodiment, the first sub-band comprises a carrier.

In one embodiment, the first sub-band comprises at least one carrier.

In one embodiment, the first sub-band belongs to a carrier.

In one embodiment, the first sub-band comprises a Bandwidth Part (BWP).

In one embodiment, if the first radio signal is transmitted by the UE, the first time-domain resource is composed of all multicarrier symbols occupied by the first radio signal.

In one embodiment, if the second radio signal is transmitted by the UE, the second time-domain resource is composed of all multicarrier symbols occupied by the second radio signal.

In one embodiment, if the first target radio signal is transmitted by the UE, the reserved time-domain resource comprises all multicarrier symbols occupied by the first target radio signal.

In one embodiment, the first time-domain resource is composed of a multicarrier symbol.

In one embodiment, the first time-domain resource is composed of multiple multicarrier symbols.

In one embodiment, the first time-domain resource is composed of multiple consecutive multicarrier symbols.

In one embodiment, the second time-domain resource is composed of a multicarrier symbol.

In one embodiment, the second time-domain resource is composed of multiple multicarrier symbols.

In one embodiment, the second time-domain resource is composed of multiple consecutive multicarrier symbols.

In one embodiment, the reserved time-domain resource is composed of a multicarrier symbol.

In one embodiment, the reserved time-domain resource is composed of multiple multicarrier symbols.

In one embodiment, the reserved time-domain resource is composed of multiple multicarrier symbols that are consecutive in time domain.

In one embodiment, the reserved time-domain resource is composed of two multicarrier symbols that are consecutive in time domain.

In one embodiment, the first time-domain resource is earlier than the second time-domain resource.

In one embodiment, the first time-domain resource, the reserved time-domain resource and the second time-domain resource are arranged in sequential order as follows: the first time-domain resource, the reserved time-domain resource and the second time-domain resource.

In one embodiment, the second time-domain resource is earlier than the first time-domain resource.

In one embodiment, the first time-domain resource, the reserved time-domain resource and the second time-domain resource are arranged in sequential order as follows: the second time-domain resource, the reserved time-domain resource and the first time-domain resource.

In one embodiment, the UE does not transmit any radio signal on a given time-domain resource in a given sub-band.

In one subembodiment, the given sub-band is the first sub-band.

In one subembodiment, the given time-domain resource is the reserved time-domain resource.

In one subembodiment, the given time-domain resource is the first time-domain resource.

In one subembodiment, the UE switches a transmission antenna or an antenna group on the given time-domain resource in the given sub-band, the antenna group being composed of a positive integer number of antenna(s).

In one subembodiment, the UE switches a transmission analog beam on the given time-domain resource in the given sub-band.

In one subembodiment, the UE switches a transmitting beam on the given time-domain resource in the given sub-band.

In one subembodiment, the UE switches a multi-antenna related transmission on the given time-domain resource in the given sub-band.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception beamforming vector.

In one embodiment, the multi-antenna related reception refers to Rx spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission beamforming vector.

In one embodiment, the multi-antenna related transmission refers to Tx spatial filtering.

In one embodiment, the Spatial Tx parameters comprise one or more of a transmission antenna port, a transmission antenna port group, a transmitting beam, a transmission analog beamforming matrix, a transmission analog beamforming vector, a transmission beamforming matrix, a transmission beamforming vector or Tx spatial filtering.

In one embodiment, the Spatial Tx parameters comprise a transmission antenna port.

In one embodiment, the Spatial Tx parameters comprise a transmission antenna port group.

In one embodiment, the Spatial Tx parameters comprise a transmitting beam.

In one embodiment, the Spatial Tx parameters comprise a transmission analog beamforming matrix.

In one embodiment, the Spatial Tx parameters comprise a transmission analog beamforming vector.

In one embodiment, the Spatial Tx parameters comprise a transmission beamforming matrix.

In one embodiment, the Spatial Tx parameters comprise a transmission beamforming vector.

In one embodiment, the Spatial Tx parameters comprise a transmission antenna port and a transmitting beam.

In one embodiment, the Spatial Tx parameters comprise a transmission antenna port and a transmission analog beamforming matrix.

In one embodiment, the Spatial Tx parameters comprise a transmission antenna port and a transmission analog beamforming vector.

In one embodiment, the Spatial Tx parameters comprise a transmission antenna port and a transmission beamforming matrix.

In one embodiment, the Spatial Tx parameters comprise a transmission antenna port and a transmission beamforming vector.

In one embodiment, the Spatial Tx parameters comprise a transmission antenna port group and a transmitting beam.

In one embodiment, the Spatial Tx parameters comprise a transmission antenna port group and a transmission analog beamforming matrix.

In one embodiment, the Spatial Tx parameters comprise a transmission antenna port group and a transmission analog beamforming vector.

In one embodiment, the Spatial Tx parameters comprise a transmission antenna port group and a transmission beamforming matrix.

In one embodiment, the Spatial Tx parameters comprise a transmission antenna port group and a transmission beamforming vector.

In one embodiment, the Spatial Rx parameters comprise one or more of a receiving beam, a reception analog beamforming matrix, a reception analog beamforming vector, a reception beamforming matrix, a reception beamforming vector or Rx spatial filtering.

In one embodiment, the Spatial Rx parameters comprise a receiving beam.

In one embodiment, the Spatial Rx parameters comprise a reception analog beamforming matrix.

In one embodiment, the Spatial Rx parameters comprise a reception analog beamforming vector.

In one embodiment, the Spatial Rx parameters comprise a reception beamforming matrix.

In one embodiment, the Spatial Rx parameters comprise a reception beamforming vector.

In one embodiment, the Spatial Rx parameters comprise Rx spatial filtering.

In one embodiment, the first access detection is used to determine whether the first sub-band is idle.

In one embodiment, an end time of the first access detection is earlier than a start time of the first time-domain resource.

In one embodiment, the first access detection comprises a positive integer number of energy detection(s), and any antenna port in a transmission antenna port group of the first radio signal is spatially correlated to any energy detection comprised in the first access detection.

In one embodiment, a transmission antenna port group of the second radio signal is spatially associated with a transmission antenna port group of the first target radio signal.

In one embodiment, an antenna port group for transmitting the first radio signal is not spatially associated with an antenna port group for transmitting the second radio signal.

In one embodiment, a transmission antenna port group of the first target radio signal is not spatially associated with a transmission antenna port group of the second radio signal.

In one embodiment, a transmission antenna port group of the first radio signal is not spatially associated with a transmission antenna port group of the first target radio signal.

In one embodiment, a transmission antenna port group of the first target radio signal is not spatially associated with a transmission antenna port group of the second radio signal.

In one embodiment, the first radio signal comprises at least one of data, control information or a reference signal.

In one embodiment, the first radio signal comprises data.

In one embodiment, the first radio signal comprises control information.

In one embodiment, the first radio signal comprises a reference signal.

In one embodiment, the first radio signal comprises data, control information and a reference signal.

In one embodiment, the first radio signal comprises data and control information.

In one embodiment, the first radio signal comprises control information and a reference signal.

In one embodiment, the first radio signal comprises data and a reference signal.

In one embodiment, the data comprised by the first radio signal is uplink data.

In one embodiment, the control information comprised by the first radio signal is Uplink control information (UCI).

In one embodiment, the control information comprised by the first radio signal comprises at least one of Hybrid Automatic Repeat reQuest (HARD) feedback, Channel State Information (CSI) or Scheduling Request (SR).

In one subembodiment, the CSI comprises at least one of Rank indication (RI), a Precoding matrix indicator (PMI), a Channel quality indicator (CQI) or a Csi-reference signal Resource Indicator (CRI).

In one embodiment, the reference signal comprised by the first radio signal comprises one or more of data, a DeModulation Reference Signal, a Sounding Reference Signal (SRS), or Phase error Tracking Reference Signals (PTRS).

In one embodiment, the reference signal comprised by the first radio signal comprises an SRS.

In one embodiment, the reference signal comprised by the first radio signal comprises data.

In one embodiment, the reference signal comprised by the first radio signal comprises an DMRS.

In one embodiment, the reference signal comprised by the first radio signal comprises data and an DMRS.

In one embodiment, the reference signal comprised by the first radio signal comprises PTRS.

In one embodiment, the first radio signal is transmitted on an uplink random access channel.

In one subembodiment, the uplink random access channel is a Physical Random Access Channel (PRACH).

In one embodiment, a transmission channel corresponding to the first radio signal is an Uplink Shared Channel (UL-SCH).

In one embodiment, the first radio signal is transmitted on an uplink physical layer data channel (i.e., an uplink channel capable of carrying physical layer data).

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, the first radio signal is transmitted on an uplink physical layer control channel (i.e., an uplink channel only capable of carrying a physical layer signaling).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the second radio signal comprises at least one of data, control information or a reference signal.

In one embodiment, the second radio signal comprises data.

In one embodiment, the second radio signal comprises control information.

In one embodiment, the second radio signal comprises a reference signal.

In one embodiment, the second radio signal comprises data, control information and a reference signal.

In one embodiment, the second radio signal comprises data and control information.

In one embodiment, the second radio signal comprises control information and a reference signal.

In one embodiment, the second radio signal comprises data and a reference signal.

In one embodiment, the data comprised by the second radio signal is uplink data.

In one embodiment, the control information comprised by the second radio signal is Uplink control information (UCI).

In one embodiment, the control information comprised by the second radio signal is at least one of Hybrid Automatic Repeat reQuest (HARD) feedback, Channel State Information (CSI) or Scheduling Request (SR).

In one subembodiment, the CSI comprises at least one of Rank indication (RI), a Precoding matrix indicator (PMI), a Channel quality indicator (CQI) or a Csi-reference signal Resource Indicator (CRI).

In one embodiment, the reference signal comprised by the second radio signal comprises one or more of data, a DeModulation Reference Signal (DMRS), a Sounding Reference Signal (SRS) or a Phase error Tracking Reference Signal (PTRS).

In one embodiment, the reference signal comprised by the second radio signal comprises an SRS.

In one embodiment, the reference signal comprised by the second radio signal comprises data.

In one embodiment, the reference signal comprised by the second radio signal comprises a DMRS.

In one embodiment, the reference signal comprised by the second radio signal comprises data and a DMRS.

In one embodiment, the reference signal comprised by the second radio signal comprises a PTRS.

In one embodiment, the second radio signal is transmitted on an uplink random access channel.

In one subembodiment, the uplink random access channel is a PRACH.

In one embodiment, a transmission channel corresponding to the second radio signal is a UL-SCH.

In one embodiment, the second radio signal is transmitted on an uplink physical layer data channel (i.e., an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the second radio signal is transmitted on an uplink physical layer control channel (i.e., an uplink channel only capable of carrying a physical layer signaling).

In one subembodiment, the uplink physical layer control channel is a PUCCH.

In one subembodiment, the uplink physical layer control channel is an sPUCCH.

In one subembodiment, the uplink physical layer control channel is an NR-PUCCH.

In one subembodiment, the uplink physical layer control channel is an NB-PUCCH.

In one embodiment, the first target radio signal comprises at least one of data, control information or a reference signal.

In one embodiment, the first target radio signal comprises data.

In one embodiment, the first target radio signal comprises control information.

In one embodiment, the first target radio signal comprises a reference signal.

In one embodiment, the first target radio signal comprises data, control information and a reference signal.

In one embodiment, the first target radio signal comprises data and control information.

In one embodiment, the first target radio signal comprises control information and a reference signal.

In one embodiment, the first target radio signal comprises data and a reference signal.

In one embodiment, the data comprised by the first target radio signal is uplink data.

In one embodiment, the control information comprised by the first target radio signal is UCI.

In one embodiment, the control information comprised by the first target radio signal comprises at least one of HARQ feedback, CSI or SR.

In one subembodiment, the CSI comprises at least one of RI, a PMI, a CQI or a CRI.

In one embodiment, the reference signal comprised by the first target radio signal comprises one or more of data, a DMRS, an SRS or PTRS.

In one embodiment, the reference signal comprised by the first target radio signal comprises an SRS.

In one embodiment, the reference signal comprised by the first target radio signal comprises data.

In one embodiment, the reference signal comprised by the first target radio signal comprises a DMRS.

In one embodiment, the reference signal comprised by the first target radio signal comprises data and a DMRS.

In one embodiment, the reference signal comprised by the first target radio signal comprises a PTRS.

In one embodiment, the first target radio signal is transmitted on an uplink random access channel.

In one subembodiment, the uplink random access channel is a PRACH.

In one embodiment, a transmission channel corresponding to the first target radio signal is a UL-SCH.

In one embodiment, the first target radio signal is transmitted on an uplink physical layer data channel (i.e., an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the first target radio signal is transmitted on an uplink physical layer control channel (i.e., an uplink channel only capable of carrying a physical layer signaling).

In one subembodiment, the uplink physical layer control channel is a PUCCH.

In one subembodiment, the uplink physical layer control channel is an sPUCCH.

In one subembodiment, the uplink physical layer control channel is an NR-PUCCH.

In one subembodiment, the uplink physical layer control channel is an NB-PUCCH.

Embodiment 2

Figure 2:
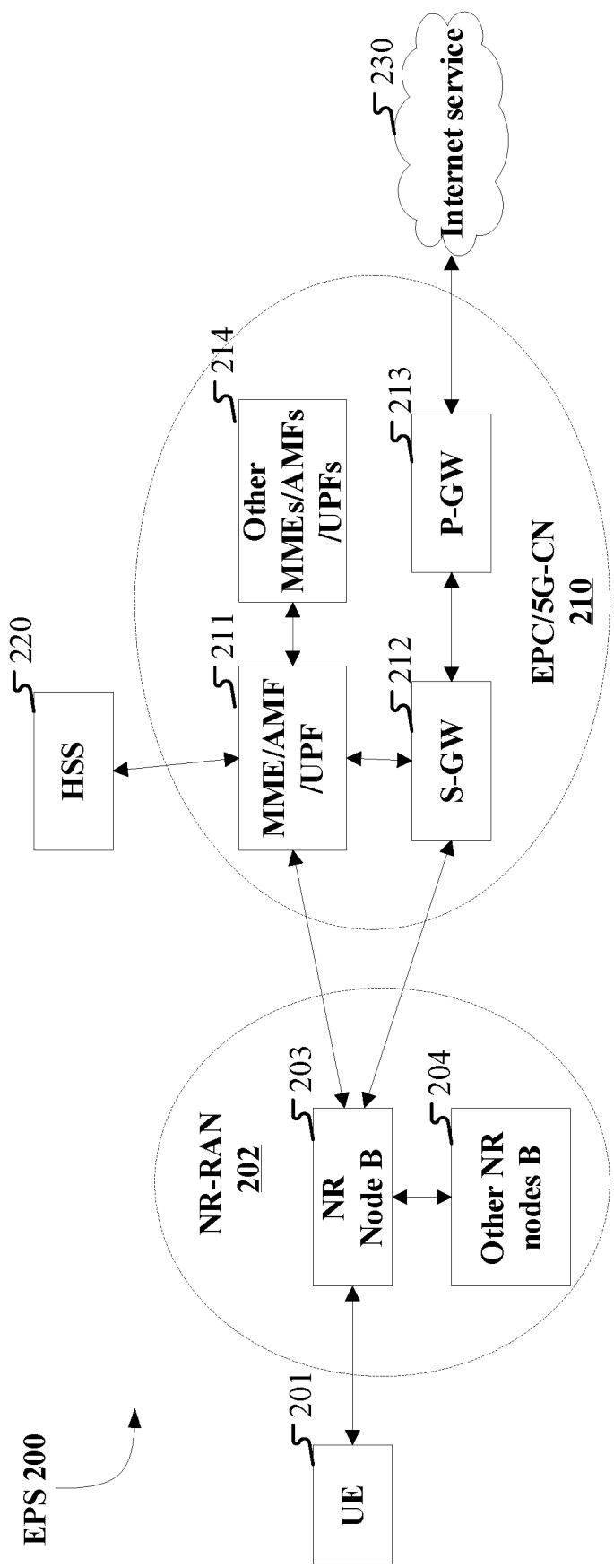
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE of the present disclosure.

In one embodiment, the gNB203 corresponds to the base station of the present disclosure.

In one embodiment, the UE 201 supports wireless communications with data transmitted on Unlicensed Spectrum.

In one embodiment, the gNB203 supports wireless communications with data transmitted on Unlicensed Spectrum.

In one embodiment, the UE 201 supports wireless communications with massive MIMO.

In one embodiment, the gNB203 supports wireless communications with massive MIMO.

Embodiment 3

Figure 3:
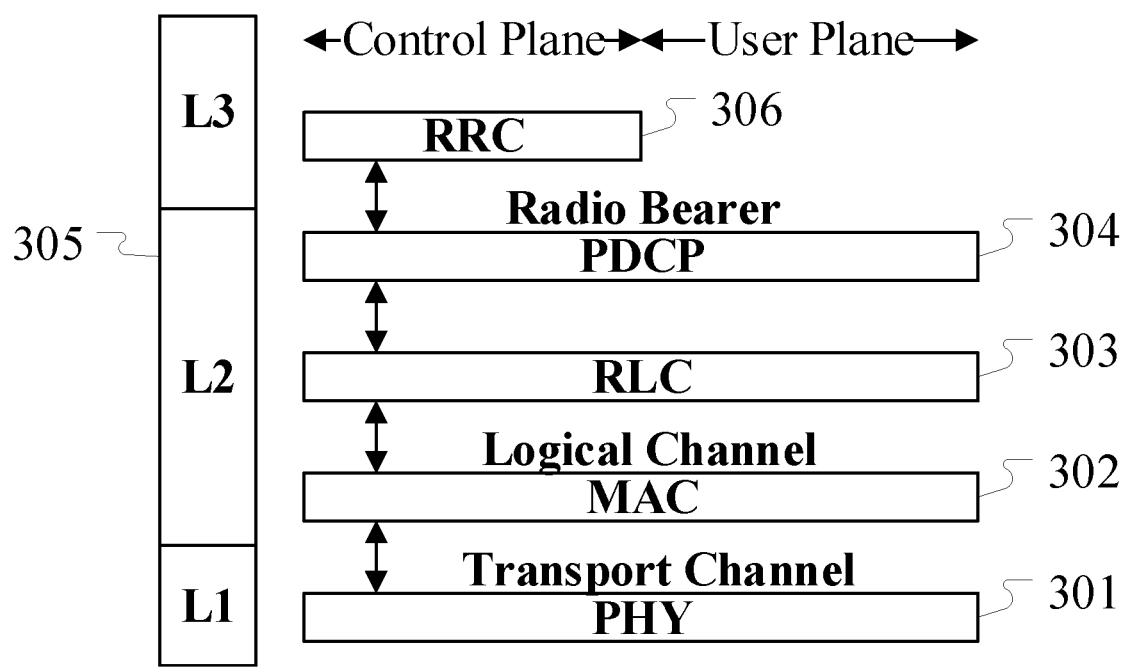
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARM). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE of the present disclosure.

In one embodiment, the radio protocol architecture in FIG. 3 is applicable to the base station of the present disclosure.

In one embodiment, the first information of the present disclosure is generated by the RRC sublayer 306.

In one embodiment, the first information of the present disclosure is generated by the MAC sublayer 302.

In one embodiment, the first information of the present disclosure is generated by the PHY 301.

In one embodiment, the first access detection of the present disclosure is generated by the PHY 301.

In one embodiment, the first radio signal of the present disclosure is generated by the PHY 301.

In one embodiment, the first target radio signal of the present disclosure is generated by the PHY 301.

In one embodiment, the first target access detection of the present disclosure is generated by the PHY 301.

In one embodiment, the second radio signal of the present disclosure is generated by the PHY 301.

In one embodiment, the second target radio signal of the present disclosure is generated by the PHY 301.

In one embodiment, the second information of the present disclosure is generated by the RRC sublayer 306.

In one embodiment, the second information of the present disclosure is generated by the MAC sublayer 302.

In one embodiment, the second information of the present disclosure is generated by the PHY 301.

In one embodiment, the third information of the present disclosure is generated by the RRC sublayer 306.

In one embodiment, the third information of the present disclosure is generated by the MAC sublayer 302.

In one embodiment, the third information of the present disclosure is generated by the PHY 301.

In one embodiment, the fourth information of the present disclosure is generated by the RRC sublayer 306.

In one embodiment, the fourth information of the present disclosure is generated by the MAC sublayer 302.

In one embodiment, the action of monitoring the first radio signal on the first time-domain resource in the first sub-band of the present disclosure is generated by the PHY 301.

In one embodiment, the action of monitoring the first target radio signal on the reserved time-domain resource in the first sub-band of the present disclosure is generated by the PHY 301.

In one embodiment, the action of monitoring the second radio signal on the second time-domain resource in the first sub-band of the present disclosure is generated by the PHY 301.

Embodiment 4

Figure 4:
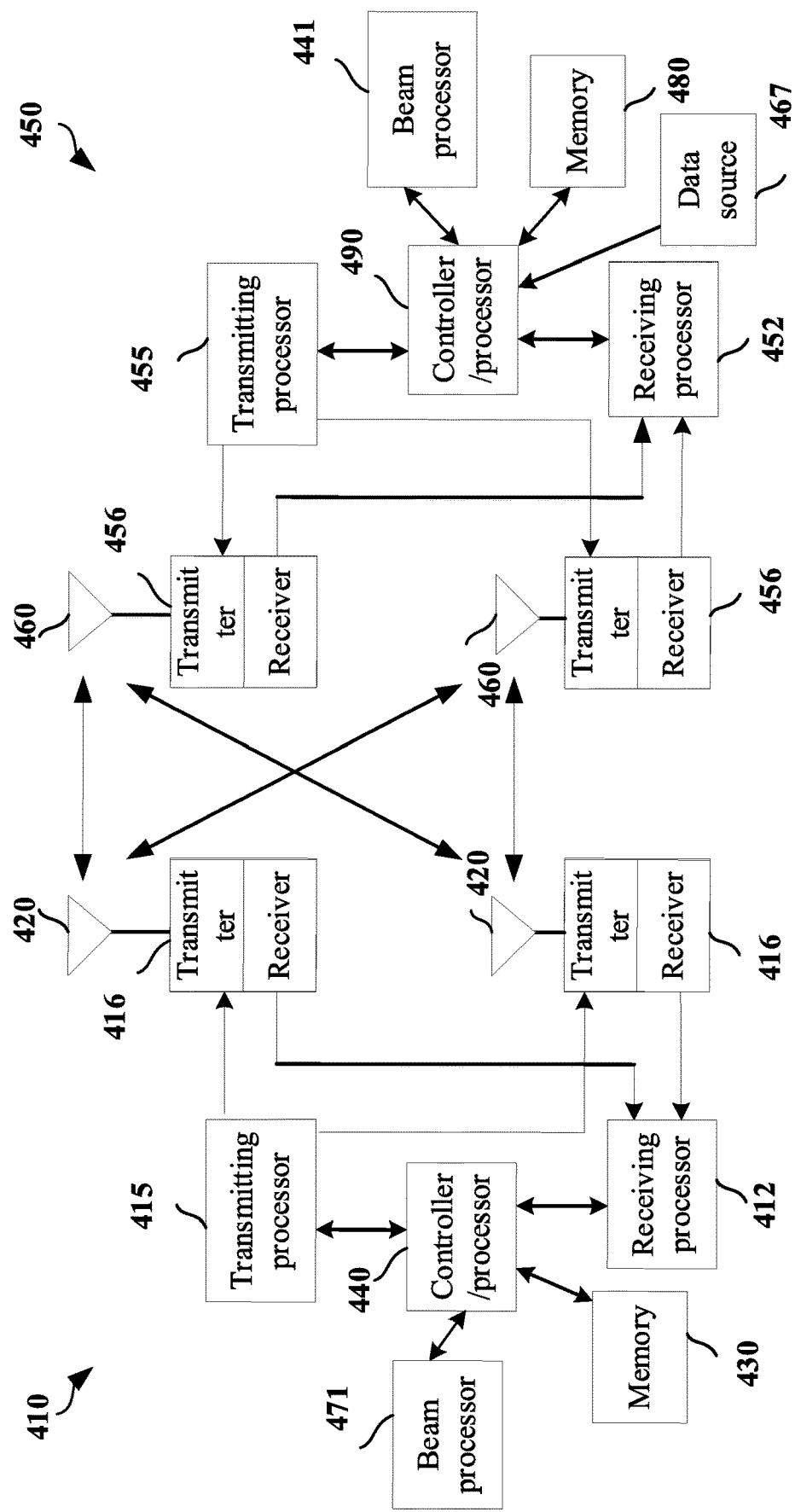
FIG. 4 illustrates a schematic diagram of a New Radio (NR) node and a UE according to one embodiment of the present disclosure.

Embodiment 4 illustrates a schematic diagram of a New Radio (NR) node and a UE according to the present disclosure, as shown in FIG. 4. FIG. 4 is a block diagram of a gNB 410 in communication with a UE 450 in an access network.

A base station (410) comprises a controller/processor 440, a memory 430, a receiving processor 412, a transmitting processor 415, a transmitter/receiver 416 and an antenna 420.

A UE (450) comprises a controller/processor 490, a memory 480, a data source 467, a transmitting processor 455, a receiving processor 452, a transmitter/receiver 456 and antenna 460.

In downlink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The beam processor 471 determines the first information.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In DL transmission, processes relevant to the UE 450 may comprise the following:

The receiver 456 is used to convert a radio frequency signal received via the antenna 460 into a baseband signal to be provided to the receiving processor 452;

The receiving processor 452 provides various signal receiving processing functions used for the L1 layer (that is PHY), including decoding, de-interleaving, descrambling, demodulating and extraction of physical layer control signaling.

The beam processor 441 determines the first information.

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE450; the higher-layer packet may be provided to a core network.

The beam processor 471 determines whether the first radio signal is transmitted on the first time-domain resource in the first sub-band.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal receiving processing functions used for the L1 layer (i.e., PHY), including decoding, de-interleaving, descrambling, demodulation and extraction of physical layer control signaling.

The controller/processor 490 performs header compression, encryption, packet segmentation and reordering as well as multiplexing between a logical channel and a transport channel based on radio resources allocation of the gNB410, thereby implementing the L2 layer functions used for the user plane and the control plane.

The controller/processor 490 is also in charge of HARQ operation, retransmission of a lost packet and a signaling to the gNB410.

The beam processor 441 determines whether to transmit the first radio signal on the first time-domain resource in the first sub-band.

In one embodiment, the UE 450 comprises at least one processor and at least one memory. The at least one memory includes computer program codes. The at least one memory and the computer program codes are configured to be used in collaboration with the at least one processor. The UE 450 at least receives first information, the first information being used to indicate a first time-domain resource and a second time-domain resource in a first sub-band, wherein the first time-domain resource is reserved for a first radio signal, and the second time-domain resource is reserved for a second radio signal; performs a first access detection to determine whether to transmit the first radio signal on the first time-domain resource in the first sub-band; and transmits the first radio signal on the first time-domain resource in the first sub-band, and does not transmit any radio signal on a reserved time-domain resource in the first sub-band; or, drops transmitting the first radio signal on the first time-domain resource in the first sub-band, and transmits a first target radio signal on the reserved time-domain resource in the first sub-band; herein, the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the UE 450 comprises a memory that stores a computer readable instruction program. The computer readable instruction program generates actions when executed by at least one processor, which include: receiving first information, the first information being used to indicate a first time-domain resource and a second time-domain resource in a first sub-band, wherein the first time-domain resource is reserved for a first radio signal, and the second time-domain resource is reserved for a second radio signal; performing a first access detection to determine whether to transmit the first radio signal on the first time-domain resource in the first sub-band; and transmitting the first radio signal on the first time-domain resource in the first sub-band, and not transmitting any radio signal on a reserved time-domain resource in the first sub-band; or, dropping transmission of the first radio signal on the first time-domain resource in the first sub-band, and transmitting a first target radio signal on the reserved time-domain resource in the first sub-band; herein, the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the gNB 410 comprises at least one processor and at least one memory. The at least one memory includes computer program codes. The at least one memory and the computer program codes are configured to be used in collaboration with the at least one processor. The gNB 410 at least transmits first information, the first information being used to indicate a first time-domain resource and a second time-domain resource in a first sub-band, wherein the first time-domain resource is reserved for a first radio signal, and the second time-domain resource is reserved for a second radio signal; monitors the first radio signal on the first time-domain resource in the first sub-band to determine whether the first radio signal is transmitted on the first time-domain resource in the first sub-band; and receives the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and the gNB 410 receives a first target radio signal on the reserved time-domain resource in the first sub-band; wherein a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the gNB 410 comprises a memory that stores a computer readable instruction program. The computer readable instruction program generates actions when executed by at least one processor, which include: transmitting first information, the first information being used to indicate a first time-domain resource and a second time-domain resource in a first sub-band, wherein the first time-domain resource is reserved for a first radio signal, and the second time-domain resource is reserved for a second radio signal; monitoring the first radio signal on the first time-domain resource in the first sub-band to determine whether the first radio signal is transmitted on the first time-domain resource in the first sub-band; and receiving the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and the gNB 410 transmitting a first target radio signal on the reserved time-domain resource in the first sub-band; wherein a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the UE 450 corresponds to the UE of the present disclosure.

In one embodiment, the gNB410 corresponds to the base station of the present disclosure.

In one embodiment, at least the first two of the receiver 456, the receiving processor 452 and the controller/processor 490 are used to receive the first information of the present disclosure.

In one embodiment, at least the first two of the transmitter 416, the transmitting processor 415 and the controller/processor 440 are used to transmit the first information of the present disclosure.

In one embodiment, at least the first two of the receiver 456, the receiving processor 452 and the controller/processor 490 are used to receive the second information of the present disclosure.

In one embodiment, at least the first two of the transmitter 416, the transmitting processor 415 and the controller/processor 440 are used to transmit the second information of the present disclosure.

In one embodiment, at least the first two of the receiver 456, the receiving processor 452 and the controller/processor 490 are used to receive the third information of the present disclosure.

In one embodiment, at least the first two of the transmitter 416, the transmitting processor 415 and the controller/processor 440 are used to transmit the third information of the present disclosure.

In one embodiment, at least the first two of the receiver 456, the receiving processor 452 and the controller/processor 490 are used to receive the fourth information of the present disclosure.

In one embodiment, at least the first two of the transmitter 416, the transmitting processor 415 and the controller/processor 440 are used to transmit the fourth information of the present disclosure.

In one embodiment, at least the first two of the receiver 456, the receiving processor 452 and the controller/processor 490 are used to perform the first access detection of the present disclosure.

In one embodiment, at least the first three of the transmitter/receiver 456, the receiving processor 452, the transmitting processor 455 and the controller/processor 490 are used to perform the first access detection of the present disclosure.

In one embodiment, at least the first two of the receiver 456, the receiving processor 452 and the controller/processor 490 are used to perform the first target access detection of the present disclosure.

In one embodiment, at least the first three of the transmitter/receiver 456, the receiving processor 452, the transmitting processor 455 and the controller/processor 490 are used to perform the first target access detection of the present disclosure.

In one embodiment, at least the first two of the receiver 456, the receiving processor 452 and the controller/processor 490 are used to perform the second access detection of the present disclosure.

In one embodiment, at least the first three of the transmitter/receiver 456, the receiving processor 452, the transmitting processor 455 and the controller/processor 490 are used to perform the second access detection of the present disclosure.

In one embodiment, at least the first two of the receiver 456, the receiving processor 452 and the controller/processor 490 are used to perform the second target access detection of the present disclosure.

In one embodiment, at least the first three of the transmitter/receiver 456, the receiving processor 452, the transmitting processor 455 and the controller/processor 490 are used to perform the second target access detection of the present disclosure.

In one embodiment, at least the first two of the transmitter 456, the transmitting processor 455 and the controller/processor 490 are used to transmit the first radio signal of the present disclosure.

In one embodiment, at least the first two of the receiver 416, the receiving processor 412 and the controller/processor 440 are used to receive the first radio signal of the present disclosure.

In one embodiment, at least the first two of the transmitter 456, the transmitting processor 455 and the controller/processor 490 are used to transmit the first target radio signal of the present disclosure.

In one embodiment, at least the first two of the receiver 416, the receiving processor 412 and the controller/processor 440 are used to receive the first target radio signal of the present disclosure.

In one embodiment, at least the first two of the transmitter 456, the transmitting processor 455 and the controller/processor 490 are used to transmit the second radio signal of the present disclosure.

In one embodiment, at least the first two of the receiver 416, the receiving processor 412 and the controller/processor 440 are used to receive the second radio signal of the present disclosure.

In one embodiment, at least the first two of the transmitter 456, the transmitting processor 455 and the controller/processor 490 are used to transmit the second target radio signal of the present disclosure.

In one embodiment, at least the first two of the receiver 416, the receiving processor 412 and the controller/processor 440 are used to receive the second target radio signal of the present disclosure.

In one embodiment, at least the first two of the receiver 416, the receiving processor 412 and the controller/processor 440 are used to monitor the first radio signal of the present disclosure on the first time-domain resource in the first sub-band of the present disclosure.

In one embodiment, at least the first two of the receiver 416, the receiving processor 412 and the controller/processor 440 are used to monitor the first target radio signal of the present disclosure on the reserved time-domain resource in the first sub-band of the present disclosure.

In one embodiment, at least the first two of the receiver 416, the receiving processor 412 and the controller/processor 440 are used to monitor the second radio signal of the present disclosure on the second time-domain resource in the first sub-band of the present disclosure.

Embodiment 5

Figure 5:
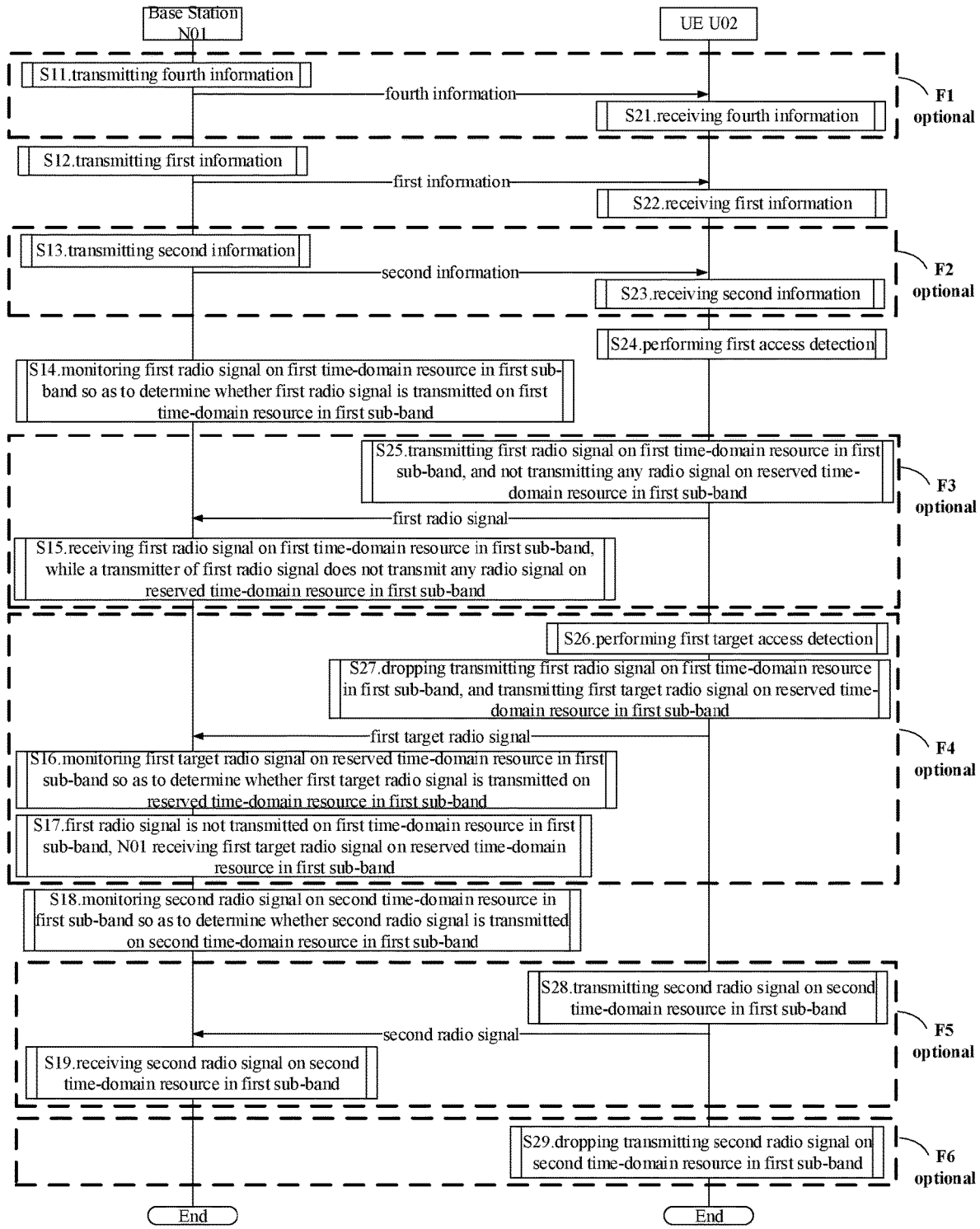
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, boxes F1, F2, F3, F4, F5 and F6 are optional.

The N01 transmits fourth information in step S11; transmits first information in step S12; and transmits second information in step S13; monitors a first radio signal on a first time-domain resource in a first sub-band in step S14 to determine whether the first radio signal is transmitted on the first time-domain resource in the first sub-band; and receives the first radio signal on the first time-domain resource in the first sub-band in step S15, while a transmitter of the first radio signal does not transmit any radio signal on a reserved time-domain resource in the first sub-band; the N01 monitors a first target radio signal on the reserved time-domain resource in the first sub-band in step S16 to determine whether the first target radio signal is transmitted on the reserved time-domain resource in the first sub-band; in step S17 the first radio signal is not transmitted on the first time-domain resource in the first sub-band, and the N01 receives a first target radio signal on the reserved time-domain resource in the first sub-band; the N01 monitors a second radio signal on a second time-domain resource in the first sub-band in step S18 to determine whether the second radio signal is transmitted on the second time-domain resource in the first sub-band; and receives the second radio signal on the second time-domain resource in the first sub-band in step S19.

The U02 receives fourth information in step S21; receives first information in step S22; and receives second information in step S23; performs a first access detection in step S24; transmits a first radio signal on a first time-domain resource in a first sub-band and does not transmit any radio signal on a reserved time-domain resource in the first sub-band in step S25; and performs a first target access detection in step S26; the U02 drops transmitting a first radio signal on the first time-domain resource in the first sub-band in step S27, and transmits a first target radio signal on the reserved time-domain resource in the first sub-band; transmits a second radio signal on a second time-domain resource in the first sub-band in step S28; and drops transmitting the second radio signal on the second time-domain resource in the first sub-band in step S29.

In Embodiment 5, the first information is used to indicate a first time-domain resource and a second time-domain resource in a first sub-band, wherein the first time-domain resource is reserved for a first radio signal, and the second time-domain resource is reserved for a second radio signal; the first access detection is performed to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s). The first target access detection is used by the U02 to determine whether to transmit the first target radio signal on the reserved time-domain resource in the first sub-band, and an end time of the first target access detection is earlier than a start time of the reserved time-domain resource. The second information is used to indicate configuration information of the first target radio signal. The fourth information is used to indicate configuration information of the first radio signal and configuration information of the second radio signal.

In one embodiment, the first information is dynamically configured, and the box F1 is optional.

In one embodiment, the first information is carried by a physical layer signaling, and the box F1 is optional.

In one embodiment, the first information is semi-statically configured, and the box F1 is not optional.

In one embodiment, the first information is carried by a higher-layer signaling, and the box F1 is not optional.

In one embodiment, the box F3 and the box F4 are not optional simultaneously.

In one embodiment, the box F3 is retained, while the box F4 is not optional; or, the box F4 is retained, while the box F3 is not optional.

In one embodiment, the box F5 and the box F6 are not optional simultaneously.

In one embodiment, the box F5 is retained, while the box F6 is not optional; or, the box F6 is retained, while the box F5 is not optional.

In one embodiment, the first target access detection is used by the U02 to determine whether the first sub-band is idle.

In one embodiment, the first target access detection comprises a positive integer number of energy detections, and any antenna port in a transmission antenna port group for the first target radio signal is spatially correlated to any energy detection comprised by the first target access detection.

In one embodiment, the first access detection comprises a positive integer number of energy detections, and any antenna port in a transmission antenna port group for the first target radio signal is not spatially correlated to any energy detection comprised by the first access detection.

In one embodiment, the first access detection comprises a positive integer number of energy detections, and any antenna port in a transmission antenna port group for the first target radio signal is spatially correlated to any energy detection comprised by the first access detection.

In one embodiment, any energy detection comprised by the first target access detection is not spatially correlated to any energy detection comprised by the first access detection.

In one embodiment, any energy detection comprised by the first target access detection is spatially correlated to any energy detection comprised by the first access detection.

In one subembodiment, the first target access detection comprises the first access detection.

In one subembodiment, the first target access detection comprises all energy detections comprised by the first access detection and a positive integer number of energy detections not belonging to the first access detection, an end time of the first access detection is earlier than a start time of the positive integer number of energy detections not belonging to the first access detection, and an end time of the positive integer number of energy detections not belonging to the first access detection is earlier than a start time of the reserved time-domain resource.

In one embodiment, the first time-domain resource is earlier than the second time-domain resource; the UE does not transmit any radio signal on the first time-domain resource in the first sub-band, and transmits the first target radio signal on the reserved time-domain resource in the first sub-band.

In one subembodiment, the UE switches a transmission antenna or an antenna group on the first time-domain resource in the first sub-band, wherein the antenna group is composed of a positive integer number of antennas.

In one subembodiment, the UE switches a transmission analog beam on the first time-domain resource in the first sub-band.

In one subembodiment, the UE switches a transmitting beam on the first time-domain resource in the first sub-band.

In one subembodiment, the UE switches multi-antenna related transmission on the first time-domain resource in the first sub-band.

In one embodiment, the second information explicitly indicates configuration information of the first target radio signal.

In one embodiment, the second information implicitly indicates configuration information of the first target radio signal.

In one embodiment, the second information is semi-statically configured.

In one embodiment, the second information is carried by a higher-layer signaling.

In one embodiment, the second information is carried by an RRC signaling.

In one embodiment, the second information is all or part of an IE in an RRC signaling.

In one embodiment, the second information is carried by a MAC CE signaling.

In one embodiment, the second information is carried by a broadcast signaling.

In one embodiment, the second information is system information.

In one embodiment, the second information is transmitted in a SIB.

In one embodiment, the second information is dynamically configured.

In one embodiment, the second information is carried by a physical-layer signaling.

In one embodiment, the second information belongs to DCI.

In one embodiment, the second information is aperiodic SRS trigger request.

In one embodiment, the second information belongs to DownLink Grant DCI.

In one embodiment, the second information belongs to UpLink Grant DCI.

In one embodiment, the second information is a field in a piece of DCI, wherein the field comprises a positive integer number of bit(s).

In one embodiment, the second information is composed by multiple fields in a piece of DCI, wherein each field comprises a positive integer number of bit(s).

In one embodiment, the second information is carried by a downlink physical layer control channel (i.e., a downlink channel only capable of carrying a physical layer signaling).

In one embodiment, the second information is carried by a PDCCH.

In one embodiment, the second information is carried by an sPDCCH.

In one embodiment, the second information is carried by an NR-PDCCH.

In one embodiment, the second information is carried by an NB-PDCCH.

In one embodiment, the second information is transmitted on a frequency band deployed on Unlicensed Spectrum.

In one embodiment, the second information is transmitted on a frequency band deployed on Licensed Spectrum.

In one embodiment, the second information is transmitted on the first sub-band.

In one embodiment, the second information is transmitted on a frequency band other than the first sub-band.

In one embodiment, the second information is transmitted on a frequency band deployed on Licensed Spectrum other than the first sub-band.

In one embodiment, the second information is transmitted on a frequency band deployed on Unlicensed Spectrum other than the first sub-band.

In one embodiment, the second information is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the second information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, a signaling identifier of the second information is C-RNTI.

In one embodiment, the second information belongs to a piece of DCI identified by C-RNTI.

In one embodiment, C-RNTI is used to generate an RS sequence of DMRS corresponding to the second information.

In one embodiment, a CRC bit sequence of the second information is scrambled by C-RNTI.

In one embodiment, the second information belongs to a piece of UE-specific DCI.

In one embodiment, the configuration information of the first target radio signal comprises at least one of a Modulation and Coding Scheme (MCS), configuration information of DMRS, a HARQ process number, a Redundancy Version (RV), a New Data Indicator (NDI), occupied time-domain resource, occupied frequency-domain resource, corresponding multi-antenna related transmission or corresponding multi-antenna related reception.

In one subembodiment, the first target radio signal comprises data.

In one sub embodiment, the configuration information of DMRS comprises one or more of occupied time-domain resource, occupied frequency-domain resource, occupied code-domain resource, cyclic shift or an Orthogonal Cover Code (OCC).

In one embodiment, the configuration information of the first target radio signal comprises at least one of occupied time-domain resource, occupied frequency-domain resource, occupied code-domain resource, cyclic shift, an Orthogonal Cover Code (OCC), occupied antenna port group, corresponding multi-antenna related transmission or corresponding multi-antenna related reception.

In one subembodiment, the first target radio signal comprises a reference signal.

In one embodiment, the configuration information of the first target radio signal comprises at least one of a HARQ process number or CSI request.

In one subembodiment, the first target radio signal comprises control information.

In one embodiment, the fourth information explicitly indicates configuration information of the first radio signal and configuration information of the second radio signal.

In one embodiment, the fourth information implicitly indicates configuration information of the first radio signal and configuration information of the second radio signal.

In one embodiment, the fourth information is semi-statically configured.

In one embodiment, the fourth information is carried by a higher-layer signaling.

In one embodiment, the fourth information is carried by an RRC signaling.

In one embodiment, the fourth information is all or part of an IE in an RRC signaling.

In one embodiment, the fourth information is carried by a MAC CE signaling.

In one embodiment, the fourth information is carried by a broadcast signaling.

In one embodiment, the fourth information is system information.

In one embodiment, the fourth information is transmitted in a SIB.

In one embodiment, the fourth information is transmitted on a frequency band deployed on Unlicensed Spectrum.

In one embodiment, the fourth information is transmitted on a frequency band deployed on Licensed Spectrum.

In one embodiment, the fourth information is transmitted on the first sub-band.

In one embodiment, the fourth information is transmitted on a frequency band other than the first sub-band.

In one embodiment, the fourth information is transmitted on a frequency band deployed on Licensed Spectrum other than the first sub-band.

In one embodiment, the fourth information is transmitted on a frequency band deployed on Unlicensed Spectrum other than the first sub-band.

In one embodiment, configuration information of the first radio signal comprises multicarrier symbols occupied by the first time-domain resource in a time-domain resource unit.

In one embodiment, configuration information of the first radio signal comprises at least one of occupied time-domain resource, occupied frequency-domain resource, occupied code-domain resource, cyclic shift, an Orthogonal Cover Code (OCC), occupied antenna port group, corresponding multi-antenna related transmission or corresponding multi-antenna related reception.

In one subembodiment, the first radio signal comprises a reference signal.

In one subembodiment, the first radio signal comprises control information.

In one subembodiment, the occupied time-domain resource refers to multicarrier symbols occupied by the first time-domain resource in a time-domain resource unit.

In one embodiment, configuration information of the second radio signal comprises multicarrier symbols occupied by the second time-domain resource in a time-domain resource unit.

In one embodiment, configuration information of the second radio signal comprises at least one of occupied time-domain resource, occupied frequency-domain resource, occupied code-domain resource, cyclic shift, an Orthogonal Cover Code (OCC), occupied antenna port group, corresponding multi-antenna related transmission or corresponding multi-antenna related reception.

In one subembodiment, the second radio signal comprises a reference signal.

In one subembodiment, the second radio signal comprises control information.

In one subembodiment, the occupied time-domain resource refers to multicarrier symbols occupied by the second time-domain resource in a time-domain resource unit.

In one embodiment, a transmission antenna port group for the second target radio signal is not spatially associated with a transmission antenna port group for the second radio signal.

In one embodiment, a transmission antenna port group for the third target radio signal is not spatially associated with a transmission antenna port group for the second radio signal.

In one embodiment, a transmission antenna port group for the first radio signal is not spatially associated with a transmission antenna port group for the second target radio signal.

In one embodiment, the base station determines according to energy of a received signal on a given time-domain resource in a given sub-band whether a given radio signal is transmitted on the given time-domain resource in the given sub-band.

In one subembodiment, the given sub-band is the first sub-band.

In one subembodiment, the given time-domain resource is the first time-domain resource, and the given radio signal is the first radio signal.

In one subembodiment, the given time-domain resource is the first time-domain resource, and the given radio signal is the second target radio signal in Embodiment 6.

In one subembodiment, the given time-domain resource is the second time-domain resource, and the given radio signal is the third target radio signal in Embodiment 6.

In one subembodiment, the given time-domain resource is the reserved time-domain resource, and the given radio signal is the first target radio signal.

In one subembodiment, the given time-domain resource is the second time-domain resource, and the given radio signal is the second radio signal.

In one subembodiment, if energy of a received signal on the given time-domain resource in the given sub-band is lower, the base station deems that the given radio signal is not transmitted on the given time-domain resource in the given sub-band, or if energy of a received signal on the given time-domain resource in the given sub-band is higher, the base station deems that the given radio signal is transmitted on the given time-domain resource in the given sub-band.

In one subembodiment, if energy of a received signal on the given time-domain resource in the given sub-band is lower than a reference energy threshold, the base station deems that the given radio signal is not transmitted on the given time-domain resource in the given sub-band, or if energy of a received signal on the given time-domain resource in the given sub-band is no lower than a reference energy threshold, the base station deems that the given radio signal is transmitted on the given time-domain resource in the given sub-band; the reference energy threshold is configured by the base station autonomously.

In one embodiment, the base station determines according to power of a received signal on a given time-domain resource in a given sub-band whether the given radio signal is transmitted on the given time-domain resource in the given sub-band.

In one subembodiment, the given sub-band is the first sub-band.

In one subembodiment, the given time-domain resource is the first time-domain resource, and the given radio signal is the first radio signal.

In one subembodiment, the given time-domain resource is the first time-domain resource, and the given radio signal is the second target radio signal in Embodiment 6.

In one subembodiment, the given time-domain resource is the second time-domain resource, and the given radio signal is the third target radio signal in Embodiment 6.

In one subembodiment, the given time-domain resource is the reserved time-domain resource, and the given radio signal is the first target radio signal.

In one subembodiment, the given time-domain resource is the second time-domain resource, and the given radio signal is the second radio signal.

In one subembodiment, if power of a received signal on the given time-domain resource in the given sub-band is lower, the base station deems that the given radio signal is not transmitted on the given time-domain resource in the given sub-band, or if power of a received signal on the given time-domain resource in the given sub-band is higher, the base station deems that the given radio signal is transmitted on the given time-domain resource in the given sub-band.

In one subembodiment, if power of a received signal on the given time-domain resource in the given sub-band is lower than a reference power threshold, the base station deems that the given radio signal is not transmitted on the given time-domain resource in the given sub-band, or if power of a received signal on the given time-domain resource in the given sub-band is no lower than a reference power threshold, the base station deems that the given radio signal is transmitted on the given time-domain resource in the given sub-band; the reference energy threshold is configured by the base station autonomously.

In one embodiment, the base station determines according to the correlation of a received signal on the given time-domain resource in the given sub-band and the given radio signal whether the given radio signal is transmitted on the given time-domain resource in the given sub-band.

In one subembodiment, the given sub-band is the first sub-band.

In one subembodiment, the given time-domain resource is the first time-domain resource, and the given radio signal is the first radio signal.

In one subembodiment, the given time-domain resource is the first time-domain resource, and the given radio signal is the second target radio signal in Embodiment 6.

In one subembodiment, the given time-domain resource is the second time-domain resource, and the given radio signal is the third target radio signal in Embodiment 6.

In one subembodiment, the given time-domain resource is the reserved time-domain resource, and the given radio signal is the first target radio signal.

In one subembodiment, the given time-domain resource is the second time-domain resource, and the given radio signal is the second radio signal.

In one subembodiment, if a received signal on a given time-domain resource in a given sub-band has a lower correlation with the given radio signal, the base station deems that the given radio signal is not transmitted on the given time-domain resource in the given sub-band, or if a received signal on a given time-domain resource in a given sub-band has a higher correlation with the given radio signal, the base station deems that the given radio signal is transmitted on the given time-domain resource in the given sub-band.

In one subembodiment, if correlation of a received signal on a given time-domain resource in a given sub-band and the given radio signal is lower than a reference correlation threshold, the base station deems that the given radio signal is not transmitted on the given time-domain resource in the given sub-band, or if correlation of a received signal on a given time-domain resource in a given sub-band and the given radio signal is no lower than a reference correlation threshold, the base station deems that the given radio signal is transmitted on the given time-domain resource in the given sub-band; the reference correlation threshold is configured by the base station autonomously.

In one embodiment, the base station measures a received signal on the given time-domain resource in the given sub-band based on configuration parameters of the given radio signal to estimate a channel, and then determines according to the channel estimated whether the given radio signal is transmitted on the given time-domain resource in the given sub-band.

In one subembodiment, the given sub-band is the first sub-band.

In one subembodiment, the given time-domain resource is the first time-domain resource, and the given radio signal is the first radio signal.

In one subembodiment, the given time-domain resource is the first time-domain resource, and the given radio signal is the second target radio signal in Embodiment 6.

In one subembodiment, the given time-domain resource is the second time-domain resource, and the given radio signal is the third target radio signal in Embodiment 6.

In one subembodiment, the given time-domain resource is the reserved time-domain resource, and the given radio signal is the first target radio signal.

In one subembodiment, the given time-domain resource is the second time-domain resource, and the given radio signal is the second radio signal.

In one subembodiment, if energy of the channel estimated is lower, the base station deems that the given radio signal is not transmitted on the given time-domain resource in the given sub-band, or if energy of the channel estimated is higher, the base station deems that the given radio signal is transmitted on the given time-domain resource in the given sub-band.

In one subembodiment, if energy of the channel estimated is lower than a reference channel energy threshold, the base station deems that the given radio signal is not transmitted on the given time-domain resource in the given sub-band, or if energy of the channel estimated is no lower than a reference channel energy threshold, the base station deems that the given radio signal is transmitted on the given time-domain resource in the given sub-band; the reference channel energy threshold is configured by the base station autonomously.

In one subembodiment, if power of the channel estimated is lower, the base station deems that the given radio signal is not transmitted on the given time-domain resource in the given sub-band, or if power of the channel estimated is higher, the base station deems that the given radio signal is transmitted on the given time-domain resource in the given sub-band.

In one subembodiment, if power of the channel estimated is lower than a reference channel power threshold, the base station deems that the given radio signal is not transmitted on the given time-domain resource in the given sub-band, or if power of the channel estimated is no lower than a reference channel power threshold, the base station deems that the given radio signal is transmitted on the given time-domain resource in the given sub-band; the reference channel power threshold is configured by the base station autonomously.

In one subembodiment, if properties of the channel estimated are not consistent with properties desirable by the base station, the base station deems that the given radio signal is not transmitted on the given time-domain resource in the given sub-band, otherwise the base station deems that the given radio signal is transmitted on the given time-domain resource in the given sub-band.

Embodiment 6

Figure 6:
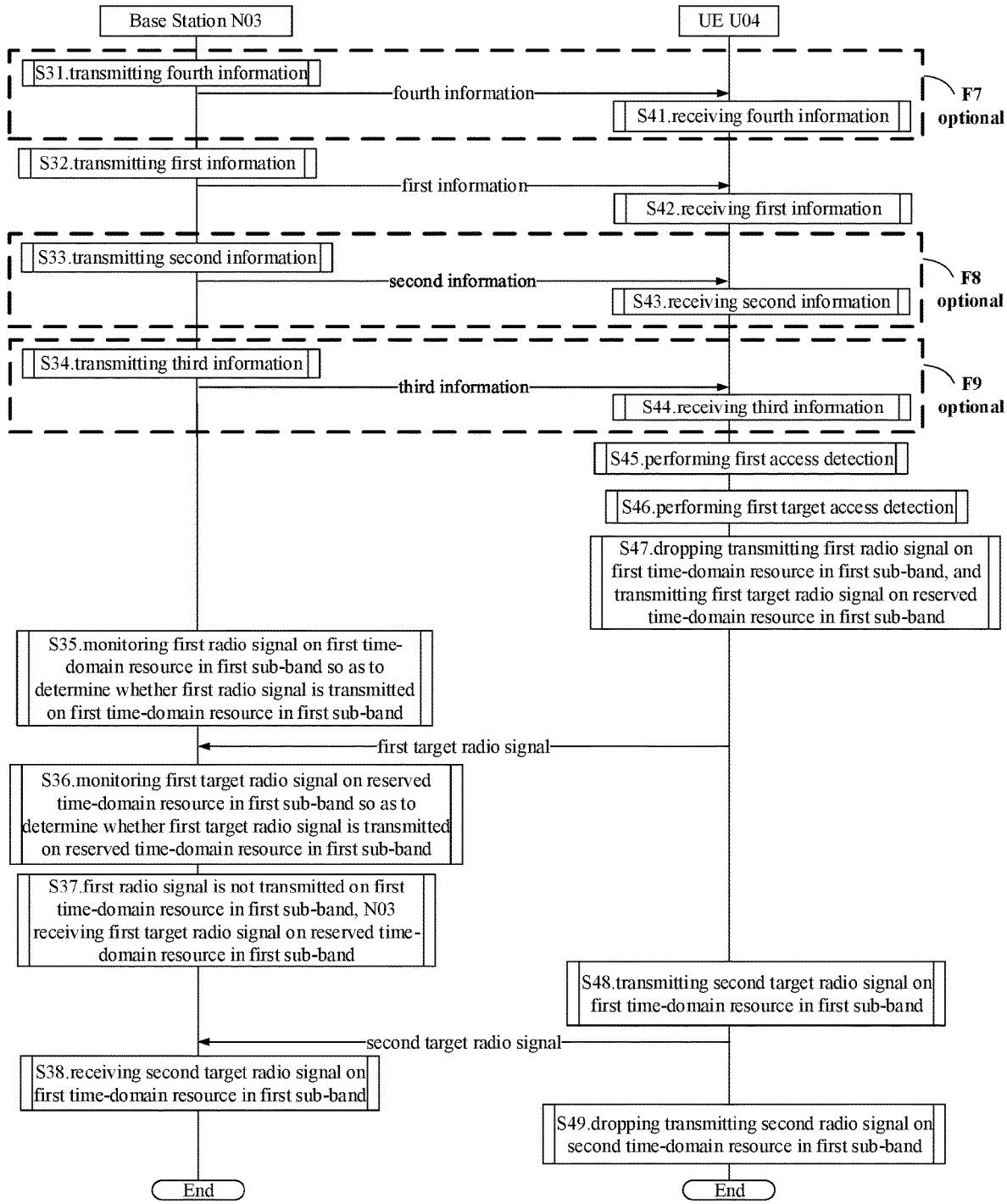
FIG. 6 illustrates a flowchart of wireless transmission according to another embodiment of the present disclosure.
Figure 7A:
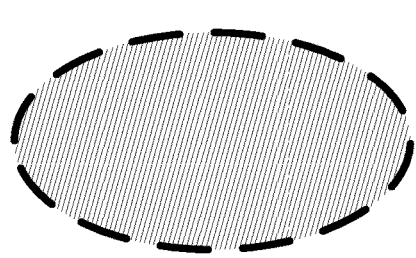
FIG. 7A-FIG. 7B respectively illustrate a schematic diagram of a first given antenna port group being spatially associated with a second given antenna port group according to one embodiment of the present disclosure.
Figure 7A:
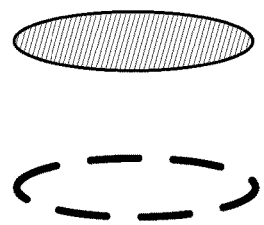
Figure 7B:
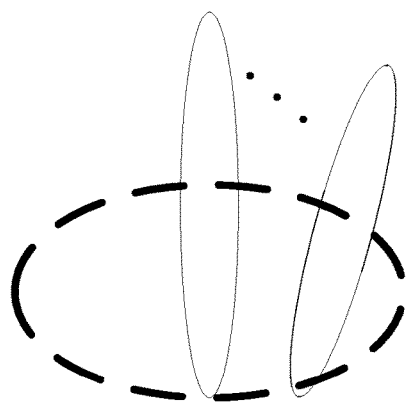
Figure 7B:
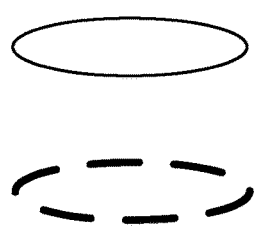
Figure 8A:
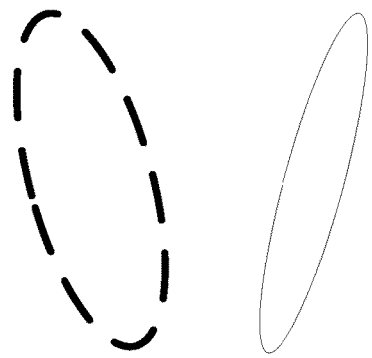
FIG. 8A-FIG. 8B respectively illustrate a schematic diagram of a first given antenna port group not being spatially associated with a second given antenna port group according to one embodiment of the present disclosure.
Figure 8B:
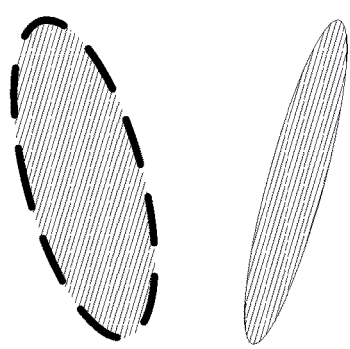
Figure 8B:

Embodiment 6 illustrates another flowchart of wireless transmission, as shown in FIG. 6. In FIG. 6, a base station N03 is a maintenance base station for a serving cell of a UE U04. In FIG. 6, boxes F7, F8 and F9 are optional.

The N03 transmits fourth information in step S31; transmits first information in step S32; transmits second information in step S33; and transmits third information in step S34; monitors a first radio signal on a first time-domain resource in a first sub-band in step S35 to determine whether the first radio signal is transmitted on the first time-domain resource in the first sub-band; and monitors a first target radio signal on a reserved time-domain resource in a first sub-band in step S36 to determine whether the first target radio signal is transmitted on the reserved time-domain resource in the first sub-band; in step S37 the first radio signal is not transmitted on the first time-domain resource in the first sub-band, and the N03 receives the first target radio signal on the reserved time-domain resource in the first sub-band; and in step S38 the N03 receives a second target radio signal on the first time-domain resource in the first sub-band.

The U04 receives fourth information in step S41; receives first information in step S42; receives second information in step S43; and receives third information in step S44; performs a first access detection in step S45; and performs a first target access detection in step S46; the U04 drops transmitting a first radio signal on a first time-domain resource in a first sub-band, and transmits a first target radio signal on a reserved time-domain resource in the first sub-band in step S47; transmits a second target radio signal on the first time-domain resource in the first sub-band in step S48; and drops transmitting a second radio signal on a second time-domain resource in the first sub-band in step S49.

In Embodiment 6, the first information is used to indicate a first time-domain resource and a second time-domain resource in a first sub-band, wherein the first time-domain resource is reserved for a first radio signal, and the second time-domain resource is reserved for a second radio signal; the first access detection is performed to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s). The first target access detection is used by the U04 to determine whether to transmit the first target radio signal on the reserved time-domain resource in the first sub-band, and an end time of the first target access detection is earlier than a start time of the reserved time-domain resource. The first time-domain resource is earlier than the second time-domain resource, the UE drops transmitting the first radio signal on the first time-domain resource in the first sub-band, and transmits the first target radio signal on the reserved time-domain resource in the first sub-band. The second information is used to indicate configuration information of the first target radio signal. The third information is used to indicate configuration information of the second target radio signal. The fourth information is used to indicate configuration information of the first radio signal and configuration information of the second radio signal.

In one embodiment, the first information is dynamically configured, and the box F7 is optional.

In one embodiment, the first information is carried by a physical layer signaling, and the box F7 is optional.

In one embodiment, the first information is semi-statically configured, and the box F7 is not optional.

In one embodiment, the first information is carried by a higher-layer signaling, and the box F7 is not optional.

In one embodiment, the second target radio signal comprises at least one of data, control information or a reference signal.

In one embodiment, the second target radio signal comprises data.

In one embodiment, the second target radio signal comprises control information.

In one embodiment, the second target radio signal comprises a reference signal.

In one embodiment, the second target radio signal comprises data, control information and a reference signal.

In one embodiment, the second target radio signal comprises data and control information.

In one embodiment, the second target radio signal comprises control information and a reference signal.

In one embodiment, the second target radio signal comprises data and a reference signal.

In one embodiment, the data comprised by the second target radio signal is uplink data.

In one embodiment, the control information comprised by the second target radio signal is Uplink control information (UCI).

In one embodiment, the control information comprised by the second target radio signal comprises at least one of Hybrid Automatic Repeat reQuest (HARQ) feedback, Channel State Information (CSI) or Scheduling Request (SR).

In one subembodiment of the above embodiment, the CSI comprises at least one of RI, a PMI, a CQI or a CRI.

In one embodiment, the reference signal comprised by the second target radio signal comprises one or more of data, a DMRS, an SRS or PTRS.

In one embodiment, the reference signal comprised by the second target radio signal comprises an SRS.

In one embodiment, the reference signal comprised by the second target radio signal comprises data.

In one embodiment, the reference signal comprised by the second target radio signal comprises a DMRS.

In one embodiment, the reference signal comprised by the second target radio signal comprises data and a DMRS.

In one embodiment, the reference signal comprised by the second target radio signal comprises a PTRS.

In one embodiment, the second target radio signal is transmitted on an uplink random access channel.

In one subembodiment, the uplink random access channel is a PRACH.

In one embodiment, a transmission channel corresponding to the second target radio signal is a UL-SCH.

In one embodiment, the second target radio signal is transmitted on an uplink physical layer data channel (i.e., an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the second target radio signal is transmitted on an uplink physical layer control channel (i.e., an uplink channel only capable of carrying a physical layer signaling).

In one subembodiment, the uplink physical layer control channel is a PUCCH.

In one subembodiment, the uplink physical layer control channel is an sPUCCH.

In one subembodiment, the uplink physical layer control channel is an NR-PUCCH.

In one subembodiment, the uplink physical layer control channel is an NB-PUCCH.

In one embodiment, if the second target radio signal is transmitted by the UE, the first time-domain resource comprises all multicarrier symbols occupied by the second target radio signal.

In one embodiment, the third information explicitly indicates configuration information of the second target radio signal.

In one embodiment, the third information implicitly indicates configuration information of the second target radio signal.

In one embodiment, the third information is semi-statically configured.

In one embodiment, the third information is carried by a higher-layer signaling.

In one embodiment, the third information is carried by an RRC signaling.

In one embodiment, the third information is all or part of an IE in an RRC signaling.

In one embodiment, the third information is carried by a MAC CE signaling.

In one embodiment, the third information is carried by a broadcast signaling.

In one embodiment, the third information is system information.

In one embodiment, the third information is transmitted in a SIB.

In one embodiment, the third information is dynamically configured.

In one embodiment, the third information is carried by a physical layer signaling.

In one embodiment, the third information belongs to DCI.

In one embodiment, the third information is aperiodic SRS trigger request.

In one embodiment, the third information belongs to Downlink Grant DCI.

In one embodiment, the third information belongs to Uplink Grant DCI.

In one embodiment, the third information is a field in a piece of DCI, wherein the field comprises a positive integer number of bit(s).

In one embodiment, the third information is composed by multiple fields in a piece of DCI, wherein each field comprises a positive integer number of bit(s).

In one embodiment, the third information is carried by a downlink physical layer control channel (i.e., a downlink channel only capable of carrying a physical layer signaling).

In one embodiment, the third information is carried by a PDCCH.

In one embodiment, the third information is carried by an sPDCCH.

In one embodiment, the third information is carried by an NR-PDCCH.

In one embodiment, the third information is carried by an NB-PDCCH.

In one embodiment, the third information is transmitted on a frequency band deployed on Unlicensed Spectrum.

In one embodiment, the third information is transmitted on a frequency band deployed on Licensed Spectrum.

In one embodiment, the third information is transmitted on the first sub-band.

In one embodiment, the third information is transmitted on a frequency band other than the first sub-band.

In one embodiment, the third information is transmitted on a frequency band deployed on Licensed Spectrum other than the first sub-band.

In one embodiment, the third information is transmitted on a frequency band deployed on Unlicensed Spectrum other than the first sub-band.

In one embodiment, the third information is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the third information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, a signaling identifier of the third information is C-RNTI.

In one embodiment, the third information belongs to a piece of DCI identified by C-RNTI.

In one embodiment, C-RNTI is used to generate an RS sequence of DMRS corresponding to the third information.

In one embodiment, a CRC bit sequence of the third information is scrambled by C-RNTI.

In one embodiment, the third information belongs to a piece of UE-specific DCI.

In one embodiment, configuration information of the second target radio signal comprises at least one of at least one of a Modulation and Coding Scheme (MCS), configuration information of DMRS, a HARQ process number, a Redundancy Version (RV), a New Data Indicator (NDI), occupied time-domain resource, occupied frequency-domain resource, corresponding multi-antenna related transmission or corresponding multi-antenna related reception.

In one subembodiment, the second target radio signal comprises data.

In one sub embodiment, the configuration information of DMRS comprises one or more of occupied time-domain resource, occupied frequency-domain resource, occupied code-domain resource, cyclic shift or an Orthogonal Cover Code (OCC).

In one embodiment, the configuration information of the second target radio signal comprises at least one of occupied time-domain resource, occupied frequency-domain resource, occupied code-domain resource, cyclic shift, an Orthogonal Cover Code (OCC), occupied antenna port group, corresponding multi-antenna related transmission or corresponding multi-antenna related reception.

In one subembodiment, the second target radio signal comprises a reference signal.

In one embodiment, the configuration information of the second target radio signal comprises at least one of a HARQ process number or CSI request.

In one subembodiment, the second target radio signal comprises control information.

In one embodiment, a third target radio signal is transmitted on the second time-domain resource in the first sub-band.

In one subembodiment, a transmission antenna port group for the third target radio signal is spatially associated with a transmission antenna port group for the second target radio signal.

In one embodiment, a transmission antenna port group for the third target radio signal is not spatially associated with a transmission antenna port group for the second radio signal.

In one embodiment, a transmission antenna port group for the first radio signal is not spatially associated with a transmission antenna port group for the third target radio signal.

In one embodiment, a transmission antenna port group for the third target radio signal is spatially associated with a transmission antenna port group for the second target radio signal.

In one subembodiment, a transmission antenna port group for the third target radio signal is the same as a transmission antenna port group for the second target radio signal.

In one subembodiment, the third target radio signal is related to the second target radio signal.

In one subembodiment, the third target radio signal is a repetition of transmission of the second target radio signal.

In one subembodiment, all pieces of configuration information comprised in the configuration information of the third target radio signal other than the occupied time-domain resource are the same as configuration information of the second target radio signal.

In one subembodiment, configuration information of the third target radio signal is the same as configuration information of the second target radio signal.

In one subembodiment, at least one piece of information comprised in configuration information of the third target radio signal is the same as configuration information of the second target radio signal.

In one subembodiment, a pattern of the third target radio signal in the second time-domain resource is the same as a pattern of the second target radio signal in the first time-domain resource.

In one subembodiment, the first time-domain resource, the reserved time-domain resource and the second time-domain resource belong to a same uplink burst, which is composed of a group of contiguous multicarrier symbols.

In one embodiment, a transmission antenna port group for the second target radio signal is spatially associated with a transmission antenna port group for the first target radio signal.

Embodiment 7

Embodiment 7A-Embodiment 7B respectively illustrate a schematic diagram of a first given antenna port group being spatially associated with a second given antenna port group.

In Embodiment 7, the first given antenna port group corresponds to a transmission antenna port group for the second radio signal of the present disclosure, and the second given antenna port group corresponds to a transmission antenna port group for the first target radio signal of the present disclosure; or, the first given antenna port group corresponds to a transmission antenna port group for the third target radio signal of the present disclosure, and the second given antenna port group corresponds to a transmission antenna port group for the second target radio signal; or, the first given antenna port group corresponds to a transmission antenna port group for the second target radio signal of the present disclosure, and the second given antenna port group corresponds to a transmission antenna port group for the first target radio signal.

In one embodiment, the phrase that the first given antenna port group is spatially associated with the second given antenna port group means that: the second given antenna port group comprises all antenna ports in the first given antenna port group.

In one embodiment, the first given antenna port group is spatially associated with the second given antenna port group, a transmission antenna or a reception antenna or an antenna group for a transmitted radio signal on the second given antenna port group comprises all transmission antennas, all reception antennas or all antenna groups for a transmitted radio signal in the first given antenna port group.

In one embodiment, the first given antenna port group is spatially associated with the second given antenna port group, a transmission antenna or an antenna group for a transmitted radio signal on the second given antenna port group comprises all transmission antennas or all antenna groups for a transmitted radio signal in the first given antenna port group.

In one embodiment, the first given antenna port group is spatially associated with the second given antenna port group, a reception antenna or an antenna group for a transmitted radio signal on the second given antenna port group comprises all reception antennas or all antenna ports for a transmitted radio signal in the first given antenna port group.

In one embodiment, the first given antenna port group is spatially associated with the second given antenna port group, a transmission antenna or an antenna group for a transmitted radio signal on the second given antenna port group comprises all reception antennas or all antenna ports for a transmitted radio signal in the first given antenna port group.

In one embodiment, the first given antenna port group is spatially associated with the second given antenna port group, a reception antenna or an antenna group for a transmitted radio signal on the second given antenna port group comprises all transmission antennas or all antenna groups for a transmitted radio signal in the first given antenna port group.

In one embodiment, the first given antenna port group is spatially associated with the second given antenna port group, a second antenna group is one or more antenna groups for generating multi-antenna related transmission or multi-antenna related reception of a transmitted radio signal on the second given antenna port group, while a first antenna group is one or more antenna groups for generating multi-antenna related transmission or multi-antenna related reception of a transmitted radio signal in the first given antenna port group, and the second antenna group comprises all antennas or all antenna groups in the first antenna group.

In one embodiment, the first given antenna port group is spatially associated with the second given antenna port group, a second antenna group is one or more antenna groups for generating multi-antenna related transmission of a transmitted radio signal on the second given antenna port group, while a first antenna group is one or more antenna groups for generating multi-antenna related transmission of a transmitted radio signal in the first given antenna port group, and the second antenna group comprises all antennas or all antenna groups in the first antenna group.

In one embodiment, the first given antenna port group is spatially associated with the second given antenna port group, a second antenna group is one or more antenna groups for generating multi-antenna related reception of a transmitted radio signal on the second given antenna port group, while a first antenna group is one or more antenna groups for generating multi-antenna related reception of a transmitted radio signal in the first given antenna port group, and the second antenna group comprises all antennas or all antenna groups in the first antenna group.

In one embodiment, the first given antenna port group is spatially associated with the second given antenna port group, a second antenna group is one or more antenna groups for generating multi-antenna related transmission of a transmitted radio signal on the second given antenna port group, while a first antenna group is one or more antenna groups for generating multi-antenna related reception of a transmitted radio signal in the first given antenna port group, and the second antenna group comprises all antennas or all antenna groups in the first antenna group.

In one embodiment, the phrase that the first given antenna port group is spatially associated with the second given antenna port group means that: the second given antenna port group comprises part of antenna ports comprised in the first given antenna port group, and any antenna port in the first given antenna port group not belonging to the second given antenna port group is Quasi Co-Located (QCL) with at least one antenna port in the second given antenna port group.

In one embodiment, the phrase that the first given antenna port group is spatially associated with the second given antenna port group means that: the second given antenna port group comprises part of antenna ports comprised in the first given antenna port group, and any antenna port in the first given antenna port group not belonging to the second given antenna port group is QCL with an antenna port in the second given antenna port group.

In one embodiment, the phrase that the first given antenna port group is spatially associated with the second given antenna port group means that: the second given antenna port group comprises part of antenna ports comprised in the first given antenna port group, and any antenna port in the first given antenna port group not belonging to the second given antenna port group is spatial QCL with at least one antenna port in the second given antenna port group.

In one embodiment, the phrase that the first given antenna port group is spatially associated with the second given antenna port group means that: the second given antenna port group comprises part of antenna ports comprised in the first given antenna port group, and any antenna port in the first given antenna port group not belonging to the second given antenna port group is spatial QCL with an antenna port in the second given antenna port group.

In one embodiment, the phrase that the first given antenna port group is spatially associated with the second given antenna port group means that: any antenna port in the first given antenna port group is QCL with at least one antenna port in the second given antenna port group.

In one embodiment, the phrase that the first given antenna port group is spatially associated with the second given antenna port group means that: any antenna port in the first given antenna port group is QCL with an antenna port in the second given antenna port group.

In one embodiment, the phrase that the first given antenna port group is spatially associated with the second given antenna port group means that: any antenna port in the first given antenna port group is spatial QCL with at least one antenna port in the second given antenna port group.

In one embodiment, the phrase that the first given antenna port group is spatially associated with the second given antenna port group means that: any antenna port in the first given antenna port group is spatial QCL with an antenna port in the second given antenna port group.

In one embodiment, the phrase that two antenna ports are QCL means that: all or part of large-scale properties of a radio signal transmitted from one of the two antenna ports can be used to infer all or part of large-scale properties of a radio signal transmitted from the other of the two antenna ports.

In one embodiment, the phrase that two antenna ports are QCL means that: the two antenna ports at least share one same QCL parameter, and the QCL parameter comprises multi-antenna related QCL parameters and multi-antenna unrelated QCL parameters.

In one embodiment, the phrase that two antenna ports are QCL means that: at least one QCL parameter of one of the two antenna ports can be used to infer at least one QCL parameter of the other of the two antenna ports.

In one embodiment, the phrase that two antenna ports are QCL means that: multi-antenna related reception of a radio signal transmitted from one of the two antenna ports can be used to infer multi-antenna related reception of a radio signal transmitted from the other of the two antenna ports.

In one embodiment, the phrase that two antenna ports are QCL means that: multi-antenna related transmission of a radio signal transmitted from one of the two antenna ports can be used to infer multi-antenna related transmission of a radio signal transmitted from the other of the two antenna ports.

In one embodiment, the phrase that two antenna ports are QCL means that: multi-antenna related reception of a radio signal transmitted from one of the two antenna ports can be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, multi-antenna related QCL parameters comprise one or more of an angle of arrival, an angle of departure, spatial correlation, multi-antenna related transmission or multi-antenna related reception.

In one embodiment, multi-antenna unrelated QCL parameters comprise one or more of delay spread, Doppler spread, Doppler shift, pathloss or average gain.

In one embodiment, the phrase that two antenna ports are spatial QCL means that: all or part of multi-antenna related large-scale properties of a radio signal transmitted from one of the two antenna ports can be used to infer all or part of multi-antenna related large-scale properties of a radio signal transmitted from the other of the two antenna ports.

In one embodiment, the phrase that two antenna ports are spatial QCL means that: the two antenna ports at least share one same multi-antenna related QCL parameter (spatial QCL parameter).

In one embodiment, the phrase that two antenna ports are spatial QCL means that: at least one multi-antenna related QCL parameter of one of the two antenna ports can be used to infer at least one multi-antenna related QCL parameter of the other of the two antenna ports.

In one embodiment, the phrase that two antenna ports are spatial QCL means that: multi-antenna related reception of a radio signal transmitted from one of the two antenna ports can be used to infer multi-antenna related reception of a radio signal transmitted from the other of the two antenna ports.

In one embodiment, the phrase that two antenna ports are spatial QCL means that: multi-antenna related transmission of a radio signal transmitted from one of the two antenna ports can be used to infer multi-antenna related transmission of a radio signal transmitted from the other of the two antenna ports.

In one embodiment, the phrase that two antenna ports are spatial QCL means that: multi-antenna related reception of a radio signal transmitted from one of the two antenna ports can be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, multi-antenna related large-scale properties of a given radio signal comprises one or more of an angle of arrival, an angle of departure, spatial correlation, multi-antenna related transmission or multi-antenna related reception.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception beamforming vector.

In one embodiment, the multi-antenna related reception refers to Rx spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission beamforming vector.

In one embodiment, the multi-antenna related transmission refers to Tx spatial filtering.

In one embodiment, the Embodiment 7A corresponds to a schematic diagram of the first given antenna port group being spatially associated with the second given antenna port group, wherein a transmitting beam of the first given antenna port group is the same as a transmitting beam of the second given antenna port group.

In one embodiment, the Embodiment 7B corresponds to a schematic diagram of the first given antenna port group being spatially associated with the second given antenna port group, wherein a transmitting beam of the second given antenna port group comprises a transmitting beam of the first given antenna port group.

Embodiment 8

Embodiment 8A-Embodiment 8B respectively illustrate a schematic diagram of a first given antenna port group not being spatially associated with a second given antenna port group.

In Embodiment 8, the first given antenna port group corresponds to a transmission antenna port group for the first radio signal of the present disclosure, while the second given antenna port group corresponds to a transmission antenna port group for the second radio signal of the present disclosure; or, the first given antenna port group corresponds to a transmission antenna port group for the first target radio signal of the present disclosure, while the second given antenna port group corresponds to a transmission antenna port group for the second radio signal of the present disclosure; or, the first given antenna port group corresponds to a transmission antenna port group for the second target radio signal of the present disclosure, while the second given antenna port group corresponds to a transmission antenna port group for the second radio signal of the present disclosure; or, the first given antenna port group corresponds to a transmission antenna port group for the third target radio signal of the present disclosure, while the second given antenna port group corresponds to a transmission antenna port group for the second radio signal of the present disclosure; or, the first given antenna port group corresponds to a transmission antenna port group for the first radio signal of the present disclosure, while the second given antenna port group corresponds to a transmission antenna port group for the first target radio signal of the present disclosure; or, the first given antenna port group corresponds to a transmission antenna port group for the first radio signal of the present disclosure, while the second given antenna port group corresponds to a transmission antenna port group for the second target radio signal of the present disclosure; or, the first given antenna port group corresponds to a transmission antenna port group for the first radio signal of the present disclosure, while the second given antenna port group corresponds to a transmission antenna port group for the third target radio signal of the present disclosure.

In one embodiment, the phrase of the first given antenna port group not being spatially associated with the second given antenna port group means that: the second given antenna port group does not comprise all antenna ports in the first given antenna port group.

In one embodiment, the phrase of the first given antenna port group not being spatially associated with the second given antenna port group means that: the second given antenna port group does not comprise at least one antenna port in the first given antenna port group.

In one embodiment, the phrase of the first given antenna port group not being spatially associated with the second given antenna port group means that: all antenna ports comprised in the second given antenna port group can transmit radio signals at the same time as all antenna ports comprised in the first given antenna port group.

In one embodiment, the phrase of the first given antenna port group not being spatially associated with the second given antenna port group means that: a radio signal transmitted from any antenna port in the second given antenna port group can be received at the same time as another radio signal transmitted from any antenna port in the first given antenna port group.

In one embodiment, the phrase of the first given antenna port group not being spatially associated with the second given antenna port group means that: a radio signal can be transmitted from any antenna port in the second given antenna port group at the same time as a radio signal transmitted from any antenna port in the first given antenna port group is received.

In one embodiment, the phrase of the first given antenna port group not being spatially associated with the second given antenna port group means that: a radio signal can be transmitted from any antenna port in the first given antenna port group at the same time as a radio signal transmitted from any antenna port in the second given antenna port group is received.

In one embodiment, the phrase of the first given antenna port group not being spatially associated with the second given antenna port group means that: transmission or reception of a radio signal on any antenna port in the first given antenna port group can be performed at the same time as transmission or reception of a radio signal on any antenna port in the second given antenna port group.

In one embodiment, the phrase of the first given antenna port group not being spatially associated with the second given antenna port group means that: a transmission antenna or a reception antenna or an antenna group for a transmitted radio signal on any antenna port in the second given antenna port group and a transmission antenna or a reception antenna or an antenna group for a transmitted radio signal on any antenna port in the first given antenna port group do not comprise a same antenna or antenna port.

In one embodiment, the phrase of the first given antenna port group not being spatially associated with the second given antenna port group means that: an antenna or antenna group for transmitting a radio signal on any antenna port in the second given antenna port group and an antenna or antenna group for transmitting a radio signal on any antenna port in the first given antenna port group do not comprise a same antenna or antenna port.

In one embodiment, the phrase of the first given antenna port group not being spatially associated with the second given antenna port group means that: a reception antenna or an antenna group for a transmitted radio signal on any antenna port in the second given antenna port group and a reception antenna or an antenna group for a transmitted radio signal on any antenna port in the first given antenna port group do not comprise a same antenna or antenna port.

In one embodiment, the phrase of the first given antenna port group not being spatially associated with the second given antenna port group means that: an antenna or antenna group for transmitting a radio signal on any antenna port in the second given antenna port group and a reception antenna or an antenna group for a transmitted radio signal on any antenna port in the first given antenna port group do not comprise a same antenna or antenna port.

In one embodiment, the phrase of the first given antenna port group not being spatially associated with the second given antenna port group means that: an antenna or antenna group for transmitting a radio signal on any antenna port in the first given antenna port group and a reception antenna or an antenna group for a transmitted radio signal on any antenna port in the second given antenna port group do not comprise a same antenna or antenna port.

In one embodiment, the phrase of the first given antenna port group not being spatially associated with the second given antenna port group means that: a second antenna group is one or more antenna groups for generating multi-antenna related transmission or multi-antenna related reception of a transmitted radio signal on any antenna port in the second given antenna port group, while a first antenna group is one or more antenna groups for generating multi-antenna related transmission or multi-antenna related reception of any antenna port in the first given antenna port group, and the first antenna group and the second antenna group do not comprise a same antenna or antenna group.

In one embodiment, the phrase of the first given antenna port group not being spatially associated with the second given antenna port group means that: a second antenna group is one or more antenna groups for generating multi-antenna related transmission of a transmitted radio signal on any antenna port in the second given antenna port group, while a first antenna group is one or more antenna groups for generating multi-antenna related transmission of any antenna port in the first given antenna port group, and the first antenna group and the second antenna group do not comprise a same antenna or antenna group.

In one embodiment, the phrase of the first given antenna port group not being spatially associated with the second given antenna port group means that: a second antenna group is one or more antenna groups for generating multi-antenna related reception of a transmitted radio signal on any antenna port in the second given antenna port group, while a first antenna group is one or more antenna groups for generating multi-antenna related reception of any antenna port in the first given antenna port group, and the first antenna group and the second antenna group do not comprise a same antenna or antenna group.

In one embodiment, the phrase of the first given antenna port group not being spatially associated with the second given antenna port group means that: a second antenna group is one or more antenna groups for generating multi-antenna related transmission of a transmitted radio signal on any antenna port in the second given antenna port group, while a first antenna group is one or more antenna groups for generating multi-antenna related reception of any antenna port in the first given antenna port group, and the first antenna group and the second antenna group do not comprise a same antenna or antenna group.

In one embodiment, the phrase of the first given antenna port group not being spatially associated with the second given antenna port group means that: a second antenna group is one or more antenna groups for generating multi-antenna related reception of a transmitted radio signal on any antenna port in the second given antenna port group, while a first antenna group is one or more antenna groups for generating multi-antenna related transmission of any antenna port in the first given antenna port group, and the first antenna group and the second antenna group do not comprise a same antenna or antenna group.

In one embodiment, the phrase of the first given antenna port group not being spatially associated with the second given antenna port group means that: at least one antenna port in the first given antenna port group cannot transmit a radio signal at the same time as at least one antenna port in the second given antenna port group.

In one embodiment, the phrase of the first given antenna port group not being spatially associated with the second given antenna port group means that: transmission or reception of a radio signal on at least one antenna port in the first given antenna port group cannot be performed at the same time as transmission or reception of a radio signal on at least one antenna port in the second given antenna port group.

In one embodiment, the phrase of the first given antenna port group not being spatially associated with the second given antenna port group means that: reception of a transmitted radio signal on at least one antenna port in the first given antenna port group and reception of a transmitted radio signal on at least one antenna port in the second given antenna port group cannot be performed simultaneously.

In one embodiment, the phrase of the first given antenna port group not being spatially associated with the second given antenna port group means that: transmission of a radio signal on at least one antenna port in the first given antenna port group and reception of a transmitted radio signal on at least one antenna port in the second given antenna port group cannot be performed simultaneously.

In one embodiment, the phrase of the first given antenna port group not being spatially associated with the second given antenna port group means that: transmission of a radio signal on at least one antenna port in the second given antenna port group and reception of a transmitted radio signal on at least one antenna port in the first given antenna port group cannot be performed simultaneously.

In one embodiment, the phrase of the first given antenna port group not being spatially associated with the second given antenna port group means that: any antenna port in the first given antenna port group cannot transmit a radio signal at the same time as at least one antenna port in the second given antenna port group.

In one embodiment, the phrase of the first given antenna port group not being spatially associated with the second given antenna port group means that: transmission or reception of a radio signal on any antenna port in the first given antenna port group cannot be performed at the same time as transmission or reception of a radio signal on at least one antenna port in the second given antenna port group.

In one embodiment, the phrase of the first given antenna port group not being spatially associated with the second given antenna port group means that: reception of a transmitted radio signal on any antenna port in the first given antenna port group and reception of a transmitted radio signal on at least one antenna port in the second given antenna port group cannot be performed simultaneously.

In one embodiment, the phrase of the first given antenna port group not being spatially associated with the second given antenna port group means that: transmission of a radio signal on any antenna port in the first given antenna port group and reception of a transmitted radio signal on at least one antenna port in the second given antenna port group cannot be performed simultaneously.

In one embodiment, the phrase of the first given antenna port group not being spatially associated with the second given antenna port group means that: transmission of a radio signal on at least one antenna port in the second given antenna port group and reception of a transmitted radio signal on any antenna port in the first given antenna port group cannot be performed simultaneously.

In one embodiment, the phrase of the first given antenna port group not being spatially associated with the second given antenna port group means that: a transmission antenna or a reception antenna or an antenna group for a transmitted radio signal on the second given antenna port group comprises at least one transmission antenna or reception antenna or at least one antenna group for a transmitted radio signal in the first given antenna port group.

In one embodiment, the phrase of the first given antenna port group not being spatially associated with the second given antenna port group means that: a transmission antenna or an antenna group for a radio signal on the second given antenna port group comprises at least one transmission antenna or antenna group for a radio signal in the first given antenna port group.

In one embodiment, the phrase of the first given antenna port group not being spatially associated with the second given antenna port group means that: a reception antenna or an antenna group for a transmitted radio signal on the second given antenna port group comprises at least one reception antenna or antenna group for a transmitted radio signal in the first given antenna port group.

In one embodiment, the phrase of the first given antenna port group not being spatially associated with the second given antenna port group means that: a transmission antenna or an antenna group for a transmitted radio signal on the second given antenna port group comprises at least one reception antenna or antenna group for a transmitted radio signal in the first given antenna port group.

In one embodiment, the phrase of the first given antenna port group not being spatially associated with the second given antenna port group means that: a reception antenna or an antenna group for a transmitted radio signal on the second given antenna port group comprises at least one transmission antenna or antenna group for a transmitted radio signal in the first given antenna port group.

In one embodiment, the phrase of the first given antenna port group not being spatially associated with the second given antenna port group means that: a second antenna group is one or more antenna groups for generating multi-antenna related transmission or multi-antenna related reception of a transmitted radio signal on the second given antenna port group, while a first antenna group is one or more antenna groups for generating multi-antenna related transmission or multi-antenna related reception of a transmitted radio signal in the first given antenna port group, and the second antenna group comprises at least one antenna or antenna group in the first antenna group.

In one embodiment, the phrase of the first given antenna port group not being spatially associated with the second given antenna port group means that: a second antenna group is one or more antenna groups for generating multi-antenna related transmission of a transmitted radio signal on the second given antenna port group, while a first antenna group is one or more antenna groups for generating multi-antenna related transmission of a transmitted radio signal in the first given antenna port group, and the second antenna group comprises at least one antenna or antenna group in the first antenna group.

In one embodiment, the phrase of the first given antenna port group not being spatially associated with the second given antenna port group means that: a second antenna group is one or more antenna groups for generating multi-antenna related reception of a transmitted radio signal on the second given antenna port group, while a first antenna group is one or more antenna groups for generating multi-antenna related reception of a transmitted radio signal in the first given antenna port group, and the second antenna group comprises at least one antenna or antenna group in the first antenna group.

In one embodiment, the phrase of the first given antenna port group not being spatially associated with the second given antenna port group means that: a second antenna group is one or more antenna groups for generating multi-antenna related transmission of a transmitted radio signal on the second given antenna port group, while a first antenna group is one or more antenna groups for generating multi-antenna related reception of a transmitted radio signal in the first given antenna port group, and the second antenna group comprises at least one antenna or antenna group in the first antenna group.

In one embodiment, the phrase of the first given antenna port group not being spatially associated with the second given antenna port group means that: a second antenna group is one or more antenna groups for generating multi-antenna related reception of a transmitted radio signal on the second given antenna port group, while a first antenna group is one or more antenna groups for generating multi-antenna related transmission of a transmitted radio signal in the first given antenna port group, and the second antenna group comprises at least one antenna or antenna group in the first antenna group.

In one embodiment, the phrase of the first given antenna port group not being spatially associated with the second given antenna port group means that: any antenna port in the first given antenna port group is not QCL with any antenna port in the second given antenna port group.

In one embodiment, the phrase of the first given antenna port group not being spatially associated with the second given antenna port group means that: at least one antenna port in the first given antenna port group is not QCL with any antenna port in the second given antenna port group.

In one embodiment, the phrase of the first given antenna port group not being spatially associated with the second given antenna port group means that: any antenna port in the first given antenna port group is not spatial QCL with any antenna port in the second given antenna port group.

In one embodiment, the phrase of the first given antenna port group not being spatially associated with the second given antenna port group means that: at least one antenna port in the first given antenna port group is not spatial QCL with any antenna port in the second given antenna port group.

In one embodiment, the phrase that two antenna ports are non-QCL means that: all or part of large-scale properties of a radio signal transmitted from one of the two antenna ports cannot be used to infer all or part of large-scale properties of a radio signal transmitted from the other of the two antenna ports.

In one embodiment, the phrase that two antenna ports are non-QCL means that: one of the two antenna ports has at least one QCL parameter different from the other of the two antenna ports, and the QCL parameter comprises multi-antenna related QCL parameters and multi-antenna unrelated QCL parameters.

In one embodiment, the phrase that two antenna ports are non-QCL means that: at least one QCL parameter of one of the two antenna ports cannot be used to infer at least one QCL parameter of the other of the two antenna ports.

In one embodiment, the phrase that two antenna ports are non-QCL means that: multi-antenna related reception of a radio signal transmitted from one of the two antenna ports cannot be used to infer multi-antenna related reception of a radio signal transmitted from the other of the two antenna ports.

In one embodiment, the phrase that two antenna ports are non-QCL means that: multi-antenna related transmission of a radio signal transmitted from one of the two antenna ports cannot be used to infer multi-antenna related transmission of a radio signal transmitted from the other of the two antenna ports.

In one embodiment, the phrase that two antenna ports are non-QCL means that: multi-antenna related reception of a radio signal transmitted from one of the two antenna ports cannot be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, the phrase that two antenna ports are not spatial QCL means that: all or part of multi-antenna related large-scale properties of a radio signal transmitted from one of the two antenna ports cannot be used to infer all or part of multi-antenna related large-scale properties of a radio signal transmitted from the other of the two antenna ports.

In one embodiment, the phrase that two antenna ports are not spatial QCL means that: one of the two antenna ports has at least one multi-antenna related QCL parameter (spatial QCL parameter) different from the other of the two antenna ports.

In one embodiment, the phrase that two antenna ports are not spatial QCL means that: at least one multi-antenna related QCL parameter of one of the two antenna ports cannot be used to infer at least one multi-antenna related QCL parameter of the other of the two antenna ports.

In one embodiment, the phrase that two antenna ports are not spatial QCL means that: multi-antenna related reception of a radio signal transmitted from one of the two antenna ports cannot be used to infer multi-antenna related reception of a radio signal transmitted from the other of the two antenna ports.

In one embodiment, the phrase that two antenna ports are not spatial QCL means that: multi-antenna related transmission of a radio signal transmitted from one of the two antenna ports cannot be used to infer multi-antenna related transmission of a radio signal transmitted from the other of the two antenna ports.

In one embodiment, the phrase that two antenna ports are not spatial QCL means that: multi-antenna related reception of a radio signal transmitted from one of the two antenna ports cannot be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, Embodiment 8A corresponds to a schematic diagram of the first given antenna port group not being spatially associated with the second given antenna port group, wherein a transmitting beam of the first given antenna port group is different from that of the second given antenna port group.

In one embodiment, Embodiment 8B corresponds to a schematic diagram of the first given antenna port group not being spatially associated with the second given antenna port group, wherein a transmitting beam of the second given antenna port group only comprises part of a transmitting beam of the first given antenna port group.

Embodiment 9

Figure 9:
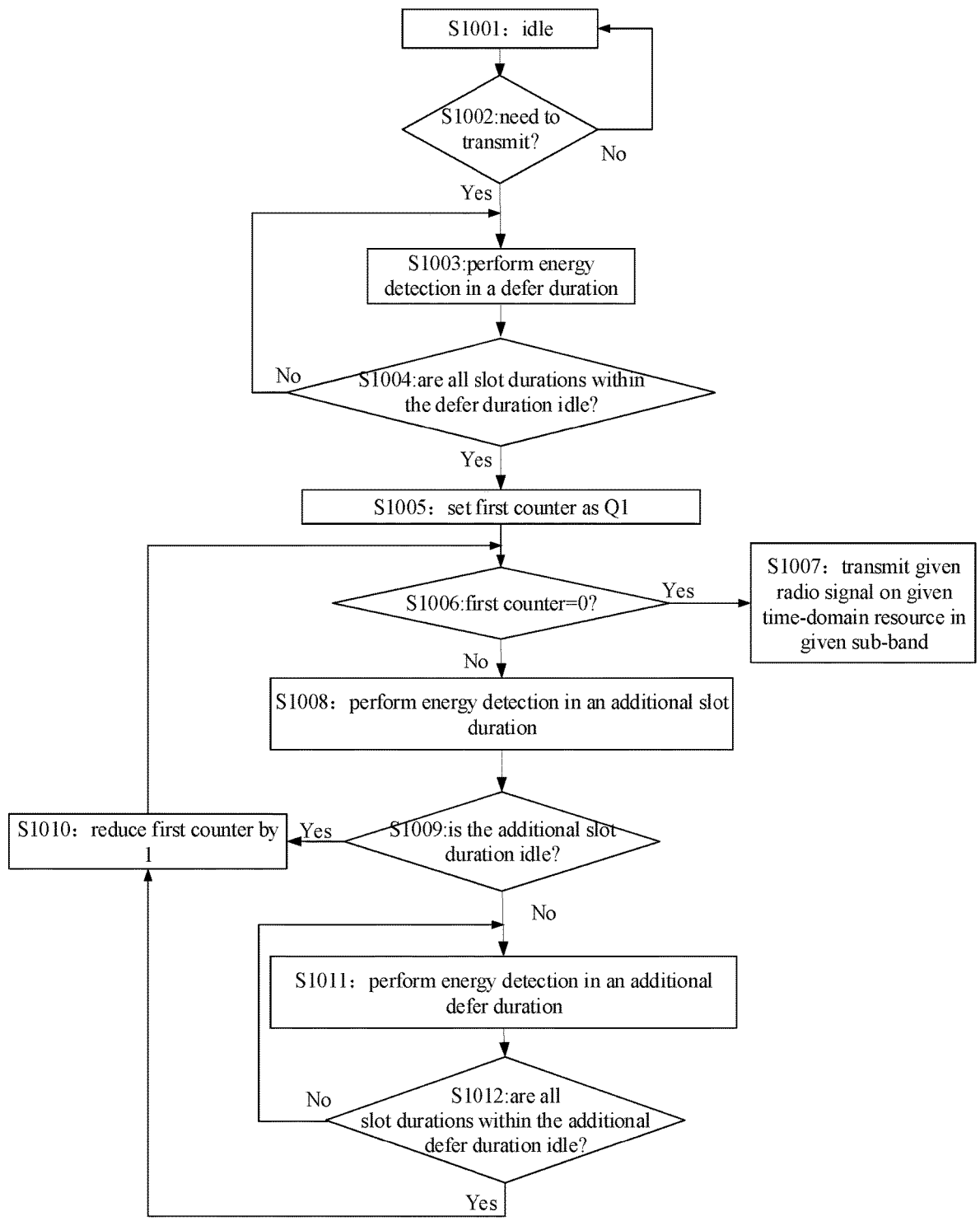
FIG. 9 illustrates a schematic diagram of a given access detection being used to determine whether to transmit a given radio signal on a given time-domain resource in a given sub-band according to one embodiment of the present disclosure.

Embodiment 9 illustrates a schematic diagram of a given access detection being used to determine whether to transmit a given radio signal on a given time-domain resource in a given sub-band; as shown in FIG. 9.

In Embodiment 9, a given time is a start time for the given time-domain resource, the given access detection comprises performing Q energy detection(s) respectively in Q time sub-pool(s) in the given sub-band to obtain Q detection value(s), Q being a positive integer. The given access detection corresponds to the first access detection of the present disclosure, the given sub-band corresponds to the first sub-band of the present disclosure, the given time-domain resource corresponds to the first time-domain resource of the present disclosure, and the given radio signal corresponds to the first radio signal of the present disclosure; or, the given access detection corresponds to the first target access detection of the present disclosure, the given sub-band corresponds to the first sub-band of the present disclosure, the given time-domain resource corresponds to the reserved time-domain resource of the present disclosure, and the given radio signal corresponds to the first target radio signal of the present disclosure; or, the given access detection corresponds to the second access detection of the present disclosure, the given sub-band corresponds to the first sub-band of the present disclosure, the given time-domain resource corresponds to the second time-domain resource of the present disclosure, and the given radio signal corresponds to the second radio signal of the present disclosure; or, the given access detection corresponds to the second target access detection of the present disclosure, the given sub-band corresponds to the first sub-band of the present disclosure, the given time-domain resource corresponds to the first time-domain resource of the present disclosure, and the given radio signal corresponds to the second target radio signal of the present disclosure. The process of the given access detection can be illustrated by the flowchart in FIG. 9.

In FIG. 9, the UE of the present disclosure is idle in step S1001, and determines whether there is need to transmit in step S1002; performs energy detection in a defer duration in step S1003; and determines in step S1004 whether all slot durations within the defer duration are idle, if yes, move forward to step S1005 to set a first counter as Q1, Q1 being a positive integer no greater than the Q; otherwise, go back to step S1004; the UE determines whether the first counter is 0 in step S1006, if yes, move forward to step S1007 to transmit a radio signal in the first sub-band of the present disclosure; otherwise move forward to step S1008 to perform energy detection in an additional slot duration; the UE determines in step S1009 whether the additional slot duration is idle, if yes, move forward to step S1010 to reduce the first counter by 1, and then go back to step S1006; otherwise move forward to step S1011 to perform energy detection in an additional defer duration; the UE determines in step S1012 whether all slot durations within the additional defer duration are idle, if yes, move back to step S1010; otherwise go back to step S1011.

In Embodiment 9, the first counter in FIG. 9 is reset to 0 before the given time, when the channel is idle as a result of the given access detection, the given radio signal can be transmitted at the given time; otherwise, the given radio signal cannot be transmitted at the given time. The prerequisite for clearing the first counter is that each of Q1 detection values among the Q detection value(s) respectively corresponding to Q1 time sub-pool(s) among the Q time sub-pool(s) is lower than a first reference threshold, a start time for the Q1 time sub-pool(s) is behind step S1005 in FIG. 9.

In one embodiment, the Q time sub-pool(s) comprises (comprise) all defer durations in FIG. 9.

In one embodiment, the Q time sub-pool(s) comprises (comprise) partial defer durations in FIG. 9.

In one embodiment, the Q time sub-pool(s) comprises (comprise) all defer durations and all additional slot durations in FIG. 9.

In one embodiment, the Q time sub-pool(s) comprises (comprise) all defer durations and partial additional slot durations in FIG. 9.

In one embodiment, the Q time sub-pool(s) comprises (comprise) all defer durations, all additional slot durations and all additional defer durations in FIG. 9.

In one embodiment, the Q time sub-pool(s) comprises (comprise) all defer durations, partial additional slot durations and all additional defer durations in FIG. 9.

In one embodiment, the Q time sub-pool(s) comprises (comprise) all defer durations partial additional slot durations and partial additional defer durations in FIG. 9.

In one embodiment, any one of the Q time sub-pool(s) lasts either 16 μs or 9 μs.

In one embodiment, any slot duration within a given time duration refers to one of the Q time sub-pool(s); the given time duration is any duration among all defer durations, all additional slot durations and all additional defer durations comprised in FIG. 9.

In one embodiment, performing energy detection in a given time duration means performing energy detection in all slot durations within the given time duration; the given time duration is any duration among all defer durations, all additional slot durations and all additional defer durations comprised in FIG. 9.

In one embodiment, a given time duration being determined to be idle through energy detection means that all slot durations within the given time duration are determined as idle through energy detection; the given time duration is any duration among all defer durations, all additional slot durations and all additional defer durations comprised in FIG. 9.

In one embodiment, a given slot duration being determined to be idle through energy detection means that the UE senses power of all radio signals in a given time unit in the given sub-band and averages in time, from which a received power acquired is lower than the first reference threshold; the given time unit is a consecutive duration within the given slot duration.

In one subembodiment, the given time unit lasts no shorter than 4 μs.

In one embodiment, a given slot duration being determined to be idle through energy detection means that the UE senses energy of all radio signals in a given time unit in the given sub-band and averages in time, from which a received energy acquired is lower than the first reference threshold; the given time unit is a consecutive duration within the given slot duration.

In one subembodiment, the given time unit lasts no shorter than 4 μs.

In one embodiment, performing energy detection in a given time duration means performing energy detection in each time sub-pool within the given time duration; the given time duration is any duration among all defer durations, all additional slot durations and all additional defer durations comprised in FIG. 9, and each time sub-pool belongs to the Q time sub-pool(s).

In one embodiment, a given time duration being determined to be idle through energy detection means that each of detection value(s) obtained through energy detection(s) on time sub-pool(s) comprised by the given time duration is lower than the first reference threshold; the given time duration is any duration among all defer durations, all additional slot durations and all additional defer durations comprised in FIG. 9. Each of the time sub-pool(s) belongs to the Q time sub-pool(s), and each of the detection value(s) belongs to the Q detection value(s).

In one embodiment, a defer duration lasts 16 µs plus M1 time(s) the length of 9 µs, M1 being a positive integer.

In one subembodiment, a defer duration comprises M1+1 time sub-pools of the Q time sub-pools.

In one reference embodiment of the above subembodiment, a first time sub-pool among the M1+1 time sub-pools lasts 16 µs, and each of the other M1 time sub-pool(s) lasts 9 µs.

In one subembodiment, the given priority class is used to determine the M1.

In one reference embodiment of the above subembodiment, the given priority class is Channel Access Priority Class, for the definition of the Channel Access Priority Class, refer to 3GPP TS36.213, section 15.

In one subembodiment, the M1 is one of 1, 2, 3 and 7.

In one embodiment, a defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, an additional defer duration lasts 16 µs plus M2 time(s) the length of 9 µs, M2 being a positive integer.

In one subembodiment, an additional defer duration comprises M2+1 time sub-pools of the Q time sub-pools.

In one reference embodiment of the above subembodiment, a first time sub-pool among the M2+1 time sub-pools lasts 16 µs, and each of the other M2 time sub-pool(s) lasts 9 µs.

In one subembodiment, the given priority class is used to determine the M2.

In one subembodiment, the M1 is one of 1, 2, 3 and 7.

In one embodiment, a defer duration lasts as long as an additional defer duration.

In one embodiment, the M1 is equal to the M2.

In one embodiment, an additional defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, a slot duration lasts 9 µs.

In one embodiment, a slot duration is one of the Q time sub-pool(s).

In one embodiment, an additional slot duration lasts 9 µs.

In one embodiment, an additional slot duration comprises one of the Q time sub-pool(s).

In one embodiment, the Q energy detection(s) is(are) used to determine whether the given sub-band is idle.

In one embodiment, the Q energy detection(s) is(are) used to determine whether the given sub-band can be used by the UE for transmitting the given radio signal.

In one embodiment, each of the Q detection value(s) is measured by dBm.

In one embodiment, each of the Q detection value(s) is measured by mW.

In one embodiment, each of the Q detection value(s) is measured by J.

In one embodiment, the Q1 is less than the Q.

In one embodiment, the Q is greater than 1.

In one embodiment, the first reference threshold is measured by dBm.

In one embodiment, the first reference threshold is measured by mW.

In one embodiment, the first reference threshold is measured by J.

In one embodiment, the first reference threshold is equal to or less than −72 dBm.

In one embodiment, the first reference threshold is any value equal to or less than a first given value.

In one subembodiment, the first given value is predefined.

In one subembodiment, the first given value is configured by a higher-layer signaling.

In one embodiment, the first reference threshold is selected by the UE liberally on the condition that the first reference threshold is equal to or less than a first given value.

In one subembodiment, the first given value is predefined.

In one subembodiment, the first given value is configured by a higher-layer signaling.

In one embodiment, the Q energy detection(s) is(are) energy detection(s) in Cat4 Listen Before Talk (LBT), the Q1 is CWp in the Cat4 LBT, the CWp is contention window size, and the detailed definition of the CWp can be found in 3GPP TS36.213, section 15.

In one embodiment, among detection value(s) of the Q detection values not belonging to the Q1 detection value(s) there is at least one detection value lower than the first reference threshold.

In one embodiment, among detection value(s) of the Q detection values not belonging to the Q1 detection value(s) there is at least one detection value no lower than the first reference threshold.

In one embodiment, any two of the Q1 time sub-pools are of equal duration.

In one embodiment, at least two of the Q1 time sub-pools are of unequal durations.

In one embodiment, the Q1 time sub-pool(s) comprises (comprise) a latest time sub-pool among the Q time sub-pools.

In one embodiment, the Q1 time sub-pool(s) only comprises(comprise) slot durations in an eCCA.

In one embodiment, the Q time sub-pools comprise the Q1 time sub-pool(s) and Q2 time sub-pool(s), and any of the Q2 time sub-pool(s) does not belong to the Q1 time sub-pool(s); Q2 is a positive integer no greater than the Q minus the Q1.

In one subembodiment, the Q2 time sub-pool(s) comprises(comprise) slot durations in an initial CCA.

In one subembodiment, positions of the Q2 time sub-pools among the Q time sub-pools are consecutive.

In one subembodiment, at least one of the Q2 time sub-pool(s) corresponds to a detection value lower than the first reference threshold.

In one subembodiment, at least one of the Q2 time sub-pool(s) corresponds to a detection value no lower than the first reference threshold.

In one subembodiment, the Q2 time sub-pool(s) comprises(comprise) all slot durations within all defer durations.

In one subembodiment, the Q2 time sub-pool(s) comprises(comprise) all slot durations within at least one additional defer duration.

In one subembodiment, the Q2 time sub-pool(s) comprises(comprise) at least one additional slot duration.

In one subembodiment, the Q2 time sub-pool(s) comprises(comprise) all slot durations within all additional slot durations and additional defer durations in FIG. 9 determined to be idle through energy detection.

In one embodiment, the Q1 time sub-pool(s) respectively belongs(belong) to Q1 sub-pool set(s), and any of the Q1 sub-pool set(s) comprises a positive integer number of time sub-pool(s) among the Q time sub-pool(s); any time sub-pool in the Q1 sub-pool set(s) corresponds to a detection value lower than the first reference threshold.

In one subembodiment, at least one of the Q1 sub-pool set(s) comprises 1 time sub-pool.

In one subembodiment, at least one of the Q1 sub-pool set(s) comprises more than 1 time sub-pool.

In one subembodiment, at least two of the Q1 sub-pool sets comprise unequal numbers of time sub-pools.

In one subembodiment, none of the Q time sub-pools belongs to two of the Q1 sub-pool sets simultaneously.

In one subembodiment, each time sub-pool in any of the Q1 sub-pool set(s) belongs to a same additional defer duration or additional slot duration determined to be idle through energy detection.

In one subembodiment, among time sub-pool(s) of the Q time sub-pools not belonging to the Q1 sub-pool set(s) there is at least one time sub-pool corresponding to a detection value lower than the first reference threshold.

In one subembodiment, among time sub-pool(s) of the Q time sub-pools not belonging to the Q1 sub-pool set(s) there is at least one time sub-pool corresponding to a detection value no lower than the first reference threshold.

Embodiment 10

Figure 10:
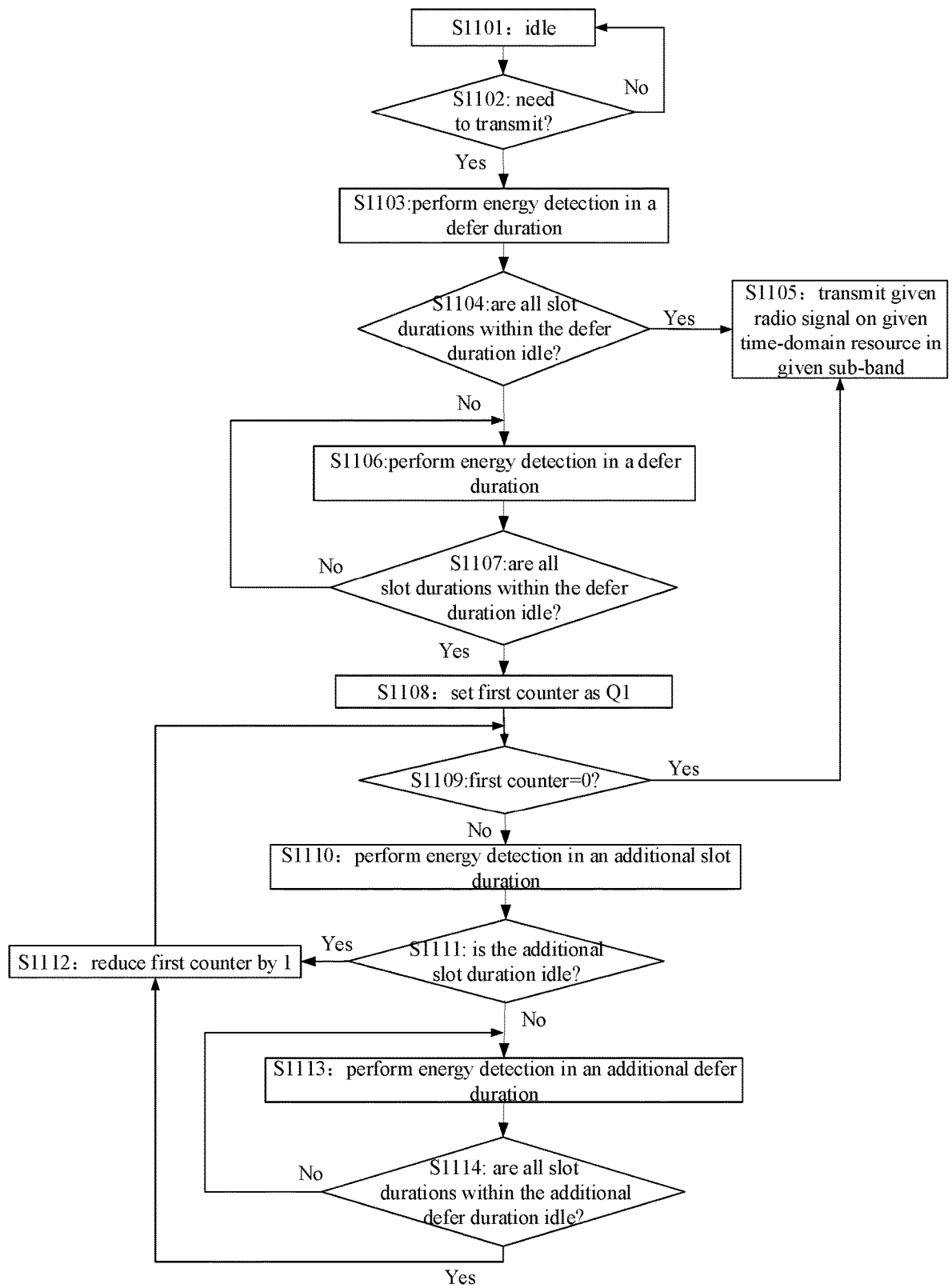
FIG. 10 illustrates a schematic diagram of a given access detection being used to determine whether to transmit a given radio signal on a given time-domain resource in a given sub-band according to another embodiment of the present disclosure.
Figure 11A:
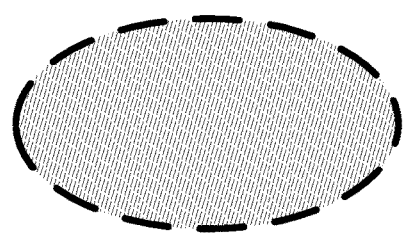
FIG. 11A-FIG. 11B respectively illustrate a schematic diagram of a given antenna port being spatially correlated to a given energy detection according to one embodiment of the present disclosure.
Figure 11A:
Figure 11A:
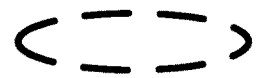
Figure 11B:
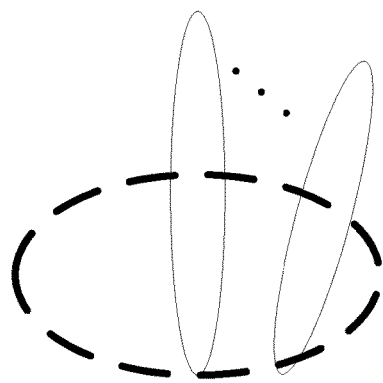
Figure 11B:
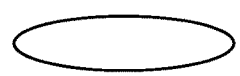
Figure 11B:
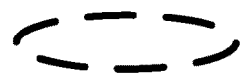
Figure 12A:
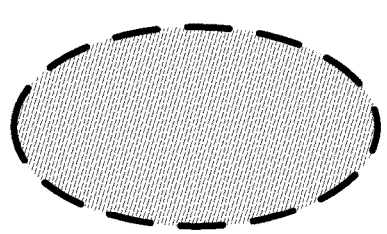
FIG. 12A-FIG. 12B respectively illustrate a schematic diagram of a first given energy detection being spatially correlated to a second given energy detection according to one embodiment of the present disclosure.
Figure 12A:
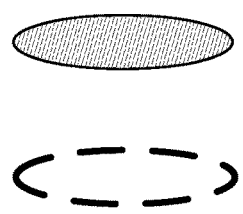
Figure 12B:
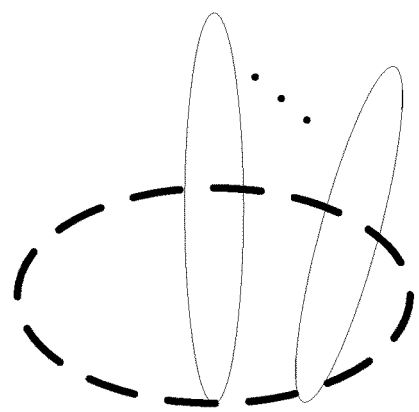
Figure 12B:
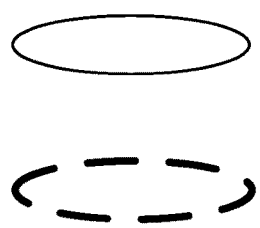

Embodiment 10 illustrates another schematic diagram of a given access detection being used to determine whether to transmit a given radio signal on a given time-domain resource in a given sub-band; as shown in FIG. 10.

In Embodiment 10, a given time is a start time for the given time-domain resource, the given access detection comprises performing Q energy detection(s) respectively in Q time sub-pool(s) in the given sub-band to obtain Q detection value(s), Q being a positive integer. The given access detection corresponds to the first access detection of the present disclosure, the given sub-band corresponds to the first sub-band of the present disclosure, the given time-domain resource corresponds to the first time-domain resource of the present disclosure, and the given radio signal corresponds to the first radio signal of the present disclosure; or, the given access detection corresponds to the first target access detection of the present disclosure, the given sub-band corresponds to the first sub-band of the present disclosure, the given time-domain resource corresponds to the reserved time-domain resource of the present disclosure, and the given radio signal corresponds to the first target radio signal of the present disclosure; or, the given access detection corresponds to the second access detection of the present disclosure, the given sub-band corresponds to the first sub-band of the present disclosure, the given time-domain resource corresponds to the second time-domain resource of the present disclosure, and the given radio signal corresponds to the second radio signal of the present disclosure; or, the given access detection corresponds to the second target access detection of the present disclosure, the given sub-band corresponds to the first sub-band of the present disclosure, the given time-domain resource corresponds to the first time-domain resource of the present disclosure, and the given radio signal corresponds to the second target radio signal of the present disclosure. The process of the given access detection can be illustrated by the flowchart in FIG. 10.

In FIG. 10, the UE of the present disclosure is idle in step S1101, and determines whether there is need to transmit in step S1102; performs energy detection in a defer duration in step S1103; and determines in step S1104 whether all slot durations within the defer duration are idle, if yes, move forward to step S1105 to transmit a radio signal in the first sub-band of the present disclosure; otherwise move forward to step S1106 to perform energy detection in a defer duration; the UE determines in step S1107 whether all slot durations within the defer duration are idle, if yes, move forward to step S1108 to set a first counter as Q1; otherwise go back to step S1106; the UE determines in step S1109 whether the first counter is 0, if yes, move back to step S1105 to transmit a radio signal in the first sub-band of the present disclosure; otherwise, move forward to step S1110 to perform energy detection in an additional slot duration; and determines in step S1111 whether the additional slot duration is idle, if yes, move forward to step S1112 to reduce the first counter by 1 and then go back to step S1109; otherwise move forward to step S1113 to perform energy detection in an additional defer duration; the UE determines in step S1114 whether all slot durations within the additional defer duration are idle, if yes, move back to step S1112; otherwise go back to step S1113.

In one embodiment, the Q1 is equal to 0, and the UE determines in step S1104 or step S1108 that all slot durations within the defer duration are idle, when the channel is idle as a result of the given access detection, the given radio signal can be transmitted at the given time; otherwise the given radio signal cannot be transmitted at the given time.

In one embodiment, the Q1 is no less than 0, and the UE determines in step S1104 that not all slot durations within the defer duration are idle. The first counter in FIG. 10 is reset to 0 before the given time, when the channel is idle as a result of the given access detection, the given radio signal can be transmitted at the given time; otherwise, the given radio signal cannot be transmitted at the given time. The prerequisite for clearing the first counter is that each of Q1 detection values among the Q detection value(s) respectively corresponding to Q1 time sub-pool(s) among the Q time sub-pool(s) is lower than the first reference threshold in Embodiment 8, a start time for the Q1 time sub-pool(s) is behind step S1108 in FIG. 10.

Embodiment 11

Embodiment 11A-Embodiment 11B respectively illustrate a schematic diagram of a given antenna port being spatially correlated to a given energy detection.

In Embodiment 11, the given antenna port corresponds to any antenna port in a transmission antenna port group for the first radio signal of the present disclosure, and the given energy detection corresponds to any energy detection in the first access detection of the present disclosure; or, the given antenna port corresponds to any antenna port in a transmission antenna port group for the first target radio signal of the present disclosure, and the given energy detection corresponds to any energy detection in the first target access detection of the present disclosure; or, the given antenna port corresponds to any antenna port in a transmission antenna port group for the first target radio signal of the present disclosure, and the given energy detection corresponds to any energy detection in the first access detection of the present disclosure; or, the given antenna port corresponds to any antenna port in a transmission antenna port group for the second radio signal of the present disclosure, and the given energy detection corresponds to any energy detection in the first target access detection of the present disclosure; or, the given antenna port corresponds to any antenna port in a transmission antenna port group for the second radio signal of the present disclosure, and the given energy detection corresponds to any energy detection in the second access detection of the present disclosure; or, the given antenna port corresponds to any antenna port in a transmission antenna port group for the second radio signal of the present disclosure, and the given energy detection corresponds to any energy detection in the first access detection of the present disclosure; or, the given antenna port corresponds to any antenna port in a transmission antenna port group for the second target radio signal of the present disclosure, and the given energy detection corresponds to any energy detection in the first target access detection of the present disclosure; or, the given antenna port corresponds to any antenna port in a transmission antenna port group for the second target radio signal of the present disclosure, and the given energy detection corresponds to any energy detection in the second target access detection of the present disclosure; or, the given antenna port corresponds to any antenna port in a transmission antenna port group for the second target radio signal of the present disclosure, and the given energy detection corresponds to any energy detection in the first target access detection of the present disclosure.

In one embodiment, the phrase that a given antenna port is spatially correlated to a given energy detection means that: multi-antenna related reception employed by the given energy detection can be used to infer multi-antenna related transmission of the given antenna port, or multi-antenna related transmission of the given antenna port can be used to infer multi-antenna related reception employed by the given energy detection.

In one embodiment, the phrase that a given antenna port is spatially correlated to a given energy detection means that: multi-antenna related reception employed by the given energy detection is the same as multi-antenna related transmission of the given antenna port.

In one embodiment, the phrase that a given antenna port is spatially correlated to a given energy detection means that: multi-antenna related reception employed by the given energy detection includes multi-antenna related transmission of the given antenna port.

In one embodiment, the phrase that a given antenna port is spatially correlated to a given energy detection means that: a beam width corresponding to a reception beamforming matrix employed by the given energy detection is no smaller than a beam width corresponding to a transmission beamforming matrix of the given antenna port.

In one embodiment, the phrase that a given antenna port is spatially correlated to a given energy detection means that: a beam direction corresponding to a reception beamforming matrix employed by the given energy detection comprises a beam direction of a transmission beamforming matrix of the given antenna port.

In one embodiment, the phrase that a given antenna port is spatially correlated to a given energy detection means that: a beam width corresponding to a receiving beam employed by the given energy detection is larger than a beam width corresponding to a transmitting beam of the given antenna port.

In one embodiment, the phrase that a given antenna port is spatially correlated to a given energy detection means that: a receiving beam employed by the given energy detection comprises a transmitting beam of the given antenna port.

In one embodiment, the phrase that a given antenna port is not spatially correlated to a given energy detection means that: multi-antenna related reception employed by the given energy detection cannot be used to infer multi-antenna related transmission of the given antenna port, or multi-antenna related transmission of the given antenna port cannot be used to infer multi-antenna related reception employed by the given energy detection.

In one embodiment, the phrase that a given antenna port is not spatially correlated to a given energy detection means that: multi-antenna related reception employed by the given energy detection is different from multi-antenna related transmission of the given antenna port.

In one embodiment, the phrase that a given antenna port is not spatially correlated to a given energy detection means that: multi-antenna related reception employed by the given energy detection does not include multi-antenna related transmission of the given antenna port.

In one embodiment, the phrase that a given antenna port is not spatially correlated to a given energy detection means that: a beam width corresponding to a reception beamforming matrix employed by the given energy detection is smaller than a beam width corresponding to a transmission beamforming matrix of the given antenna port.

In one embodiment, the phrase that a given antenna port is not spatially correlated to a given energy detection means that: a beam direction corresponding to a reception beamforming matrix employed by the given energy detection does not comprise a beam direction of a transmission beamforming matrix of the given antenna port.

In one embodiment, the phrase that a given antenna port is not spatially correlated to a given energy detection means that: a beam width corresponding to a receiving beam employed by the given energy detection is smaller than a beam width corresponding to a transmitting beam of the given antenna port.

In one embodiment, the phrase that a given antenna port is not spatially correlated to a given energy detection means that: a receiving beam employed by the given energy detection does not comprise a transmitting beam of the given antenna port.

In one embodiment, a number of antennas employed by the given energy detection is smaller than a number of transmission antennas of the given antenna port.

In one embodiment, a number of antennas employed by the given energy detection is greater than 1.

In one embodiment, a number of transmission antennas of the given antenna port is greater than 1.

In one embodiment, the Embodiment 11A corresponds to a schematic diagram of the given antenna port being spatially correlated to the given energy detection, wherein a receiving beam employed by the given energy detection is the same as a transmitting beam of the given antenna port.

In one embodiment, the Embodiment 11B corresponds to a schematic diagram of the given antenna port being spatially correlated to the given energy detection, wherein a receiving beam employed by the given energy detection comprises a transmitting beam of the given antenna port.

Embodiment 12

Embodiment 12A-Embodiment 12B respectively illustrate a schematic diagram of a first given energy detection being spatially correlated to a second given energy detection, as shown in FIG. 12.

In Embodiment 12, the first given energy detection corresponds to any energy detection in the first target access detection of the present disclosure, while the second given energy detection corresponds to any energy detection in the first access detection of the present disclosure; or, the first given energy detection corresponds to any energy detection in the second access detection of the present disclosure, while the second given energy detection corresponds to any energy detection in the first access detection of the present disclosure; or, the first given energy detection corresponds to any energy detection in the second target access detection of the present disclosure, while the second given energy detection corresponds to any energy detection in the first target access detection of the present disclosure.

In one embodiment, the phrase that a first given energy detection is spatially correlated to a second given energy detection means that: multi-antenna related reception employed by the first given energy detection can be used to infer multi-antenna related reception employed by the second given energy detection, or, multi-antenna related reception employed by the second given energy detection can be used to infer multi-antenna related reception employed by the first given energy detection.

In one embodiment, the phrase that a first given energy detection is spatially correlated to a second given energy detection means that: multi-antenna related reception employed by the first given energy detection is the same as multi-antenna related reception employed by the second given energy detection.

In one embodiment, the phrase that a first given energy detection is spatially correlated to a second given energy detection means that: multi-antenna related reception employed by the first given energy detection includes multi-antenna related reception employed by the second given energy detection, or, multi-antenna related reception employed by the second given energy detection includes multi-antenna related reception employed by the first given energy detection.

In one embodiment, the phrase that a first given energy detection is spatially correlated to a second given energy detection means that: a beam direction corresponding to a reception beamforming matrix employed by the first given energy detection comprises a beam direction corresponding to a reception beamforming matrix employed by the second given energy detection, or, a beam direction corresponding to a reception beamforming matrix employed by the second given energy detection comprises a beam direction corresponding to a reception beamforming matrix employed by the first given energy detection.

In one embodiment, the phrase that a first given energy detection is spatially correlated to a second given energy detection means that: a receiving beam employed by the first given energy detection comprises a receiving beam employed by the second given energy detection, or, a receiving beam employed by the second given energy detection comprises a receiving beam employed by the first given energy detection.

In one embodiment, a number of antennas employed by the first given energy detection is the same as a number of antennas employed by the second given energy detection.

In one embodiment, a number of antennas employed by the first given energy detection is different from a number of antennas employed by the second given energy detection.

In one embodiment, a number of antennas employed by the first given energy detection is greater than 1.

In one embodiment, a number of antennas employed by the first given energy detection is equal to 1.

In one embodiment, a number of antennas employed by the second given energy detection is greater than 1.

In one embodiment, a number of antennas employed by the second given energy detection is equal to 1.

In one embodiment, the Embodiment 12A corresponding to a schematic diagram of the first given energy detection being spatially correlated to the second given energy detection, wherein a receiving beam employed by the first given energy detection is the same as a receiving beam employed by the second given energy detection.

In one embodiment, the Embodiment 12B corresponding to a schematic diagram of the first given energy detection being spatially correlated to the second given energy detection, wherein a receiving beam employed by the first given energy detection comprises a receiving beam employed by the second given energy detection.

Embodiment 13

Figure 13:
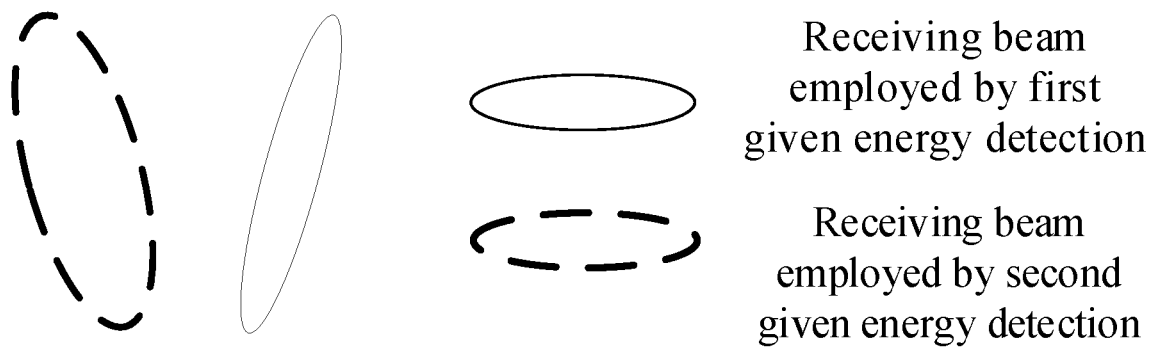
FIG. 13 illustrates a schematic diagram of a first given energy detection not being spatially correlated to a second given energy detection according to one embodiment of the present disclosure.

Embodiment 13 illustrates a schematic diagram of a first given energy detection not being spatially correlated to a second given energy detection, as shown in FIG. 13.

In Embodiment 13, the first given energy detection corresponds to any energy detection in the first target access detection of the present disclosure, while the second given energy detection corresponds to any energy detection in the first access detection of the present disclosure.

In one embodiment, the phrase of a first given energy detection not being spatially correlated to a second given energy detection means that: multi-antenna related reception employed by the first given energy detection cannot be used to infer multi-antenna related reception employed by the second given energy detection, or, multi-antenna related reception employed by the second given energy detection cannot be used to infer multi-antenna related reception employed by the first given energy detection.

In one embodiment, the phrase of a first given energy detection not being spatially correlated to a second given energy detection means that: multi-antenna related reception employed by the first given energy detection is different from multi-antenna related reception employed by the second given energy detection.

In one embodiment, the phrase of a first given energy detection not being spatially correlated to a second given energy detection means that: multi-antenna related reception employed by the first given energy detection does not include multi-antenna related reception employed by the second given energy detection, or, multi-antenna related reception employed by the second given energy detection does not include multi-antenna related reception employed by the first given energy detection.

In one embodiment, the phrase of a first given energy detection not being spatially correlated to a second given energy detection means that: a beam direction corresponding to a reception beamforming matrix employed by the first given energy detection does not comprise a beam direction corresponding to a reception beamforming matrix employed by the second given energy detection, or, a beam direction corresponding to a reception beamforming matrix employed by the second given energy detection does not comprise a beam direction corresponding to a reception beamforming matrix employed by the first given energy detection.

In one embodiment, the phrase of a first given energy detection not being spatially correlated to a second given energy detection means that: a beam direction corresponding to a reception beamforming matrix employed by the first given energy detection is different from a beam direction corresponding to a reception beamforming matrix employed by the second given energy detection.

In one embodiment, the phrase of a first given energy detection not being spatially correlated to a second given energy detection means that: a receiving beam employed by the first given energy detection does not comprise a receiving beam employed by the second given energy detection, or, a receiving beam employed by the second given energy detection does not comprise a receiving beam employed by the first given energy detection.

In one embodiment, the phrase of a first given energy detection not being spatially correlated to a second given energy detection means that: a receiving beam employed by the first given energy detection is different from a receiving beam employed by the second given energy detection.

In one embodiment, a number of antennas employed by the first given energy detection is different from a number of antennas employed by the second given energy detection.

In one embodiment, a number of antennas employed by the first given energy detection is greater than 1.

In one embodiment, a number of antennas employed by the first given energy detection is equal to 1.

In one embodiment, a number of antennas employed by the second given energy detection is greater than 1.

In one embodiment, a number of antennas employed by the second given energy detection is equal to 1.

Embodiment 14

Figure 14A:
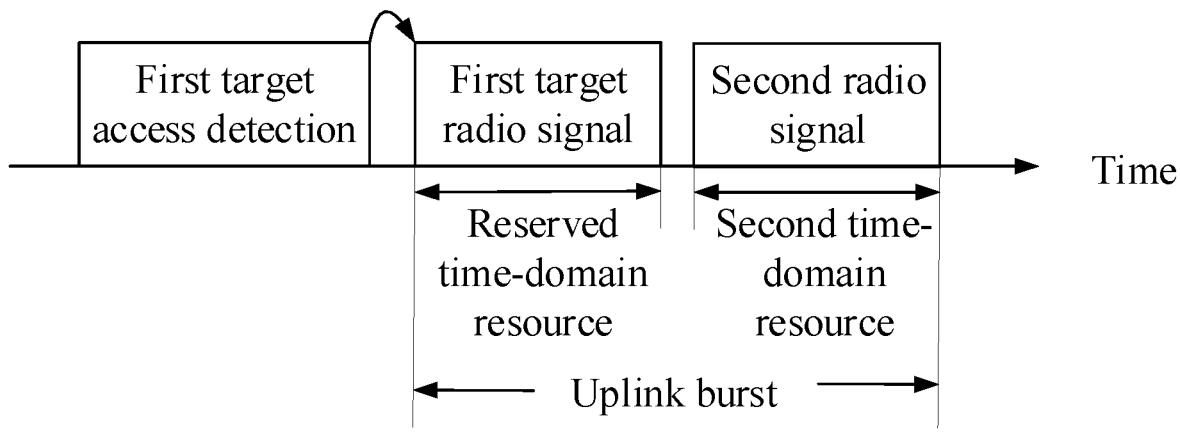
FIG. 14A-FIG. 14B respectively illustrate a schematic diagram of determining transmission of a second radio signal according to one embodiment of the present disclosure.
Figure 14B:
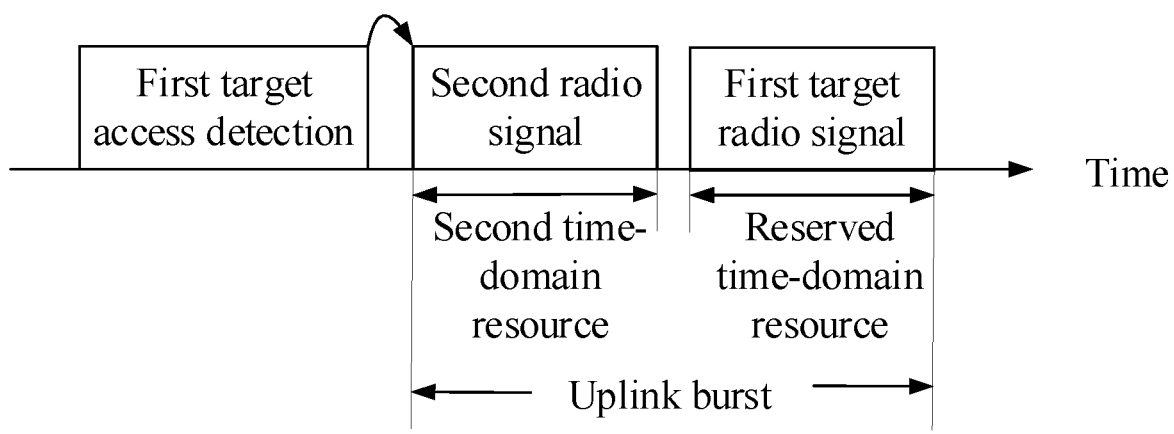

Embodiment 14A-Embodiment 14B respectively illustrate a schematic diagram of determining transmission of a second radio signal, as shown in FIG. 14.

In Embodiment 14, the second radio signal is transmitted on the second time-domain resource in the first sub-band of the present disclosure; or, transmission of the second radio signal is dropped on the second time-domain resource in the first sub-band. The first target access detection of the present disclosure is also used to determine whether to transmit the second radio signal on the second time-domain resource in the first sub-band.

In one embodiment, the first target access detection comprises a positive integer number of energy detection(s), and any antenna port in a transmission antenna port group for the second radio signal is spatially correlated to any energy detection in the first target access detection.

In one embodiment, a transmission antenna port group for the second radio signal is spatially associated with a transmission antenna port group for the first target radio signal.

In one embodiment, a transmission antenna port group for the second radio signal is the same as a transmission antenna port group for the first target radio signal.

In one embodiment, the first target radio signal is related to the second radio signal.

In one embodiment, the first target radio signal is a repetition of transmission of the second radio signal.

In one embodiment, all pieces of configuration information comprised in configuration information of the first target radio signal other than occupied time-domain resource are the same as configuration information of the second radio signal.

In one embodiment, configuration information of the first target radio signal is the same as configuration information of the second radio signal.

In one embodiment, at least one piece of information in configuration information of the first target radio signal is the same as configuration information of the second radio signal.

In one embodiment, a pattern of the first target radio signal in the reserved time-domain resource is the same as that of the second radio signal in the second time-domain resource.

In one embodiment, an end time of the first target access detection is earlier than a start time of the reserved time-domain resource and a start time of the second time-domain resource.

In one embodiment, the reserved time-domain resource and the second time-domain resource belong to a same uplink burst, which is composed of a group of contiguous multicarrier symbols.

In one embodiment, the Embodiment 14A corresponds to a schematic diagram of the first target access detection being also used to determine whether to transmit the second radio signal on the second time-domain resource in the first sub-band, wherein the reserved time-domain resource is earlier than the second time-domain resource.

In one embodiment, the Embodiment 14B corresponds to a schematic diagram of the first target access detection being also used to determine whether to transmit the second radio signal on the second time-domain resource in the first sub-band, wherein the second time-domain resource is earlier than the reserved time-domain resource.

Embodiment 15

Figure 15:
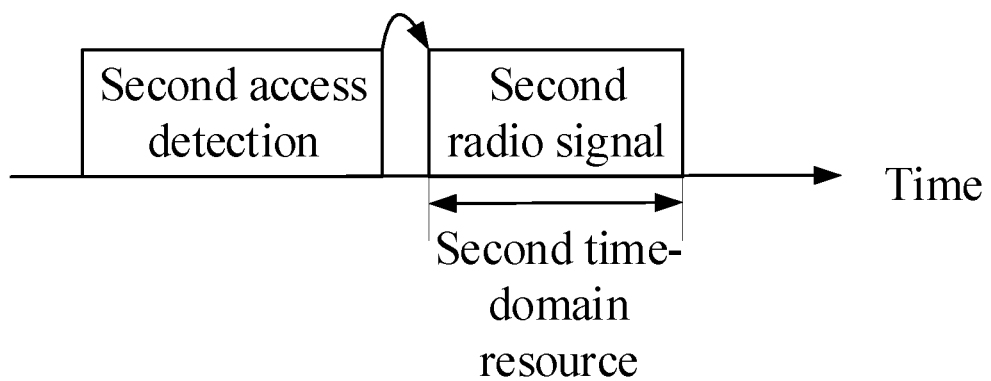
FIG. 15 illustrates a schematic diagram of determining transmission of a second radio signal according to another embodiment of the present disclosure.

Embodiment 15 illustrates another schematic diagram of determining transmission of a second radio signal, as shown in FIG. 15.

In Embodiment 15, the second radio signal is transmitted on the second time-domain resource in the first sub-band of the present disclosure; or, transmission of the second radio signal is dropped on the second time-domain resource in the first sub-band. A second access detection is performed to determine whether to transmit the second radio signal on the second time-domain resource in the first sub-band; if yes, the second radio signal is transmitted on the second time-domain resource in the first sub-band; if no, transmission of the second radio signal is dropped on the second time-domain resource in the first sub-band.

In one embodiment, the second access detection is used to determine whether the first sub-band is idle.

In one embodiment, an end time of the second access detection is earlier than a start time of the second time-domain resource.

In one embodiment, the second access detection comprises a positive integer number of energy detection(s), and any antenna port in a transmission antenna port group for the second radio signal is spatially correlated to any energy detection in the second access detection.

In one embodiment, the first access detection comprises a positive integer number of energy detection(s), and any antenna port in a transmission antenna port group for the second radio signal is not spatially correlated to any energy detection in the first access detection.

In one embodiment, the first access detection comprises a positive integer number of energy detection(s), and any antenna port in a transmission antenna port group for the second radio signal is spatially correlated to any energy detection in the first access detection.

In one embodiment, any energy detection in the second access detection is not spatially correlated to any energy detection in the first access detection.

In one embodiment, any energy detection in the second access detection is spatially correlated to any energy detection in the first access detection.

In one subembodiment, the second access detection comprises the first access detection.

In one subembodiment, the second access detection comprises all energy detections comprised in the first access detection and a positive integer number of energy detection(s) not belonging to the first access detection; an end time of the first access detection is earlier than a start time of the positive integer number of energy detection(s) not belonging to the first access detection, and an end time of the positive integer number of energy detection(s) not belonging to the first access detection is earlier than a start time of the second time-domain resource.

Embodiment 16

Figure 16A:
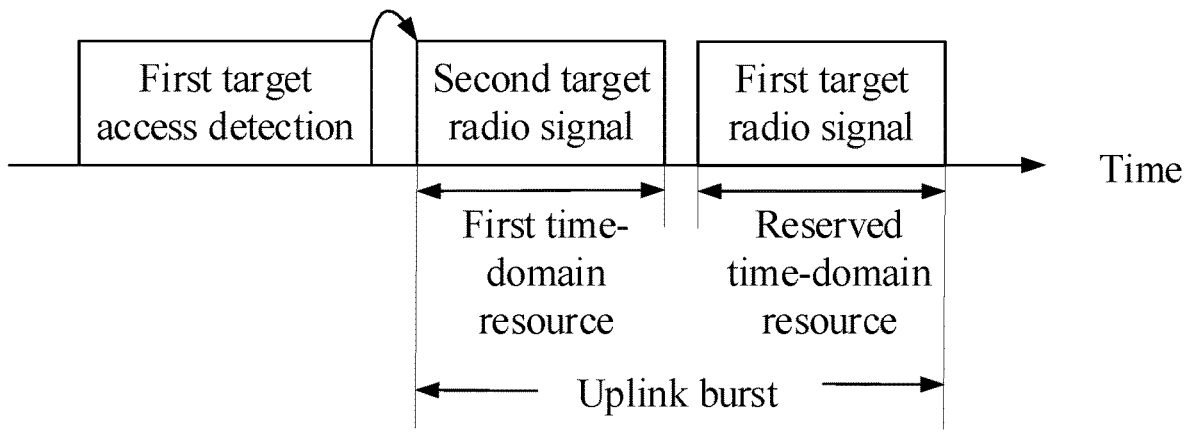
FIG. 16A-FIG. 16B respectively illustrate a schematic diagram of determining transmission of a second target radio signal according to one embodiment of the present disclosure.
Figure 16B:
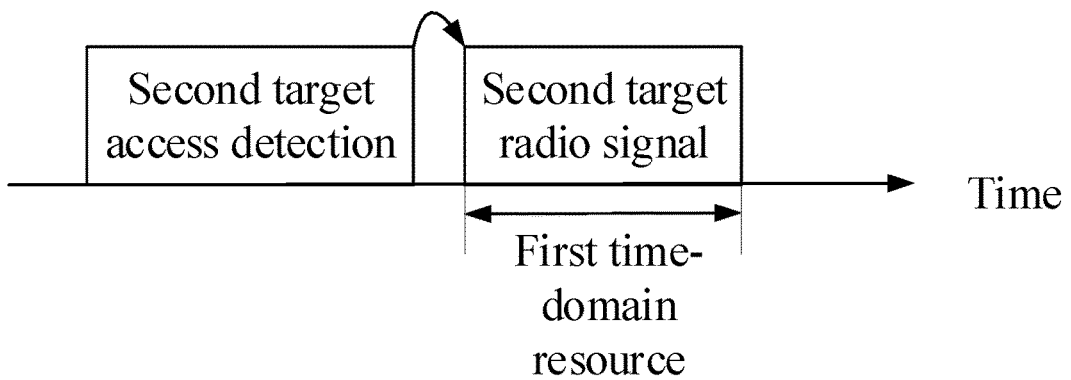

Embodiment 16A-Embodiment 16B respectively illustrate a schematic diagram of determining transmission of a second target radio signal, as shown in FIG. 16.

In Embodiment 16, a second target radio signal is transmitted on the first time-domain resource in the first sub-band; and transmission of the second radio signal is dropped on the second time-domain resource in the first sub-band; herein, the first time-domain resource is earlier than the second time-domain resource, the UE drops transmitting the first radio signal on the first time-domain resource in the first sub-band, and transmits the first target radio signal on the reserved time-domain resource in the first sub-band.

In one embodiment, the first target access detection is also used to determine whether to transmit a second target radio signal on the first time-domain resource in the first sub-band, and an end time of the first target access detection is earlier than a start time of the first time-domain resource and a start time of the reserved time-domain resource.

In one subembodiment, the first time-domain resource and the reserved time-domain resource belong to a same uplink burst, which is composed of a group of contiguous multicarrier symbols.

In one subembodiment, the first target access detection comprises a positive integer number of energy detection(s), and any antenna port in a transmission antenna port group for the second target radio signal is spatially correlated to any energy detection in the first target access detection.

In one subembodiment, the first access detection comprises a positive integer number of energy detection(s), and any antenna port in a transmission antenna port group for the second target radio signal is not spatially correlated to any energy detection in the first access detection.

In one subembodiment, a transmission antenna port group for the second target radio signal is spatially associated with a transmission antenna port group for the first target radio signal.

In one subembodiment, a transmission antenna port group for the second target radio signal is the same as a transmission antenna port group for the first target radio signal.

In one subembodiment, the first target radio signal is related to the second target radio signal.

In one subembodiment, the first target radio signal is a repetition of transmission of the second target radio signal.

In one subembodiment, all pieces of configuration information comprised in configuration information of the first target radio signal other than occupied time-domain resource are the same as configuration information of the second target radio signal.

In one subembodiment, configuration information of the first target radio signal is the same as configuration information of the second target radio signal.

In one subembodiment, at least one piece of information in configuration information of the first target radio signal is the same as configuration information of the second target radio signal.

In one subembodiment, a pattern of the first target radio signal in the reserved time-domain resource is the same as that of the second target radio signal in the second time-domain resource.

In one subembodiment, any energy detection in the first target access detection is not spatially correlated to any energy detection in the first access detection.

In one embodiment, a second target access detection is performed to determine whether to transmit the second target radio signal on the first time-domain resource in the first sub-band; if yes, the second target radio signal is transmitted on the first time-domain resource in the first sub-band; if no, transmission of the second target radio signal is dropped on the first time-domain resource in the first sub-band.

In one subembodiment, the second target access detection is used to determine whether the first sub-band is idle.

In one subembodiment, an end time of the second target access detection is earlier than a start time of the first time-domain resource.

In one subembodiment, the second target access detection comprises a positive integer number of energy detection(s), and any antenna port in a transmission antenna port group for the second target radio signal is spatially correlated to any energy detection in the second target access detection.

In one subembodiment, the first target access detection comprises a positive integer number of energy detection(s), and any antenna port in a transmission antenna port group for the second target radio signal is not spatially correlated to any energy detection in the first target access detection.

In one subembodiment, the first target access detection comprises a positive integer number of energy detection(s), and any antenna port in a transmission antenna port group for the second target radio signal is spatially correlated to any energy detection in the first target access detection.

In one subembodiment, the first access detection comprises a positive integer number of energy detection(s), and any antenna port in a transmission antenna port group for the second target radio signal is not spatially correlated to any energy detection in the first access detection.

In one subembodiment, any energy detection in the second target access detection is not spatially correlated to any energy detection in the first access detection.

In one subembodiment, any energy detection in the second target access detection is not spatially correlated to any energy detection in the first target access detection.

In one subembodiment, any energy detection in the second target access detection is spatially correlated to any energy detection in the first target access detection.

In one subsidiary embodiment of the above subembodiment, the first target access detection comprises the second target access detection.

In one subsidiary embodiment of the above subembodiment, the first target access detection comprises all energy detections comprised in the second target access detection and a positive integer number of energy detection(s) not belonging to the second target access detection; an end time of the second target access detection is earlier than a start time of the positive integer number of energy detection(s) not belonging to the second target access detection, and an end time of the positive integer number of energy detection(s) not belonging to the second target access detection is earlier than a start time of the reserved time-domain resource.

In one embodiment, the Embodiment 16A corresponds to a schematic diagram of the first target access detection also being used to determine whether to transmit a second target radio signal on the first time-domain resource in the first sub-band.

In one embodiment, the Embodiment 16B corresponds to a schematic diagram of a second target access detection being performed to determine whether to transmit a second target radio signal on the first time-domain resource in the first sub-band.

Embodiment 17

Figure 17:
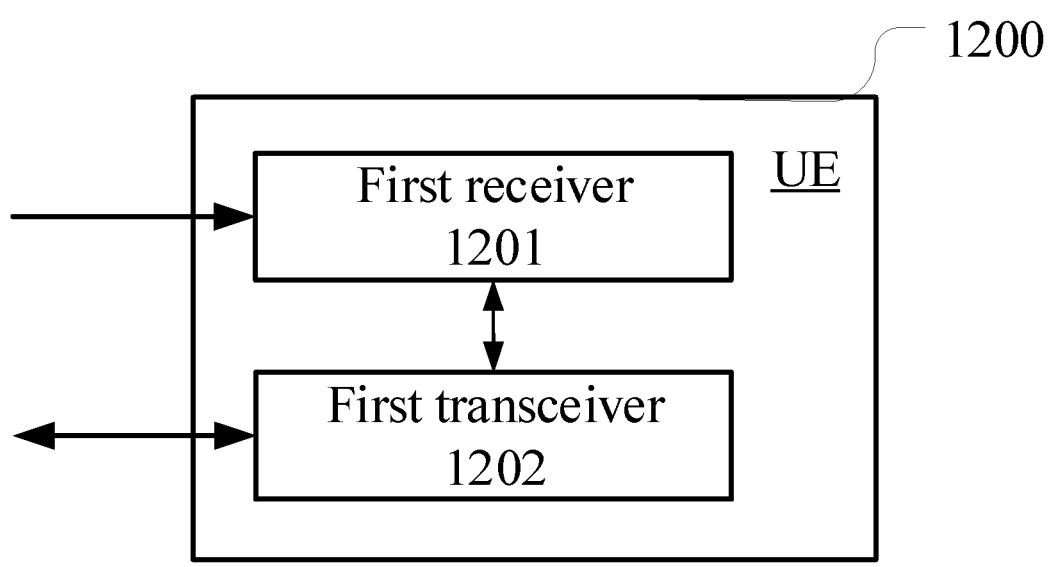
FIG. 17 illustrates a structure block diagram of a processing device in a UE according to one embodiment of the present disclosure.

Embodiment 17 illustrates a structure block diagram of a processing device in a UE, as shown in FIG. 17. In FIG. 17. A UE's processing device 1200 comprises a first receiver 1201 and a first transceiver 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first transceiver 1202 comprises the transmitter/receiver 456, the transmitting processor 455, the receiving processor 452 and the controller/processor 490 in Embodiment 4.

In one embodiment, the first transceiver 1202 comprises at least the first three of the transmitter/receiver 456, the transmitting processor 455, the receiving processor 452 and the controller/processor 490 in Embodiment 4.

The first receiver 1201 receives first information, the first information being used to indicate a first time-domain resource and a second time-domain resource in a first sub-band, wherein the first time-domain resource is reserved for a first radio signal, and the second time-domain resource is reserved for a second radio signal.

The first transceiver 1202 performs a first access detection to determine whether to transmit the first radio signal on the first time-domain resource in the first sub-band; transmits the first radio signal on the first time-domain resource in the first sub-band, and does not transmit any radio signal on a reserved time-domain resource in the first sub-band; or, drops transmitting the first radio signal on the first time-domain resource in the first sub-band, and transmits a first target radio signal on the reserved time-domain resource in the first sub-band.

In Embodiment 17, the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the first transceiver 1202 also performs a first target access detection; wherein the first target access detection is used to determine whether to transmit the first target radio signal on the reserved time-domain resource in the first sub-band, and an end time of the first target access detection is earlier than a start time of the reserved time-domain resource.

In one embodiment, the first transceiver 1202 also transmits the second radio signal on the second time-domain resource in the first sub-band; or, drops transmitting the second radio signal on the second time-domain resource in the first sub-band.

In one embodiment, the first transceiver 1202 also transmits a second target radio signal on the first time-domain resource in the first sub-band; and drops transmitting the second radio signal on the second time-domain resource in the first sub-band; wherein the first time-domain resource is earlier than the second time-domain resource, the UE drops transmitting the first radio signal on the first time-domain resource in the first sub-band, and transmits the first target radio signal on the reserved time-domain resource in the first sub-band.

In one embodiment, the first receiver 1201 also receives second information; wherein the second information is used to indicate configuration information of the first target radio signal.

In one embodiment, the first receiver 1201 also receives third information; wherein the third information is used to indicate configuration information of the second target radio signal.

In one embodiment, the first receiver 1201 also receives fourth information; wherein the fourth information is used to indicate configuration information of the first radio signal and configuration information of the second radio signal.

Embodiment 18

Figure 18:
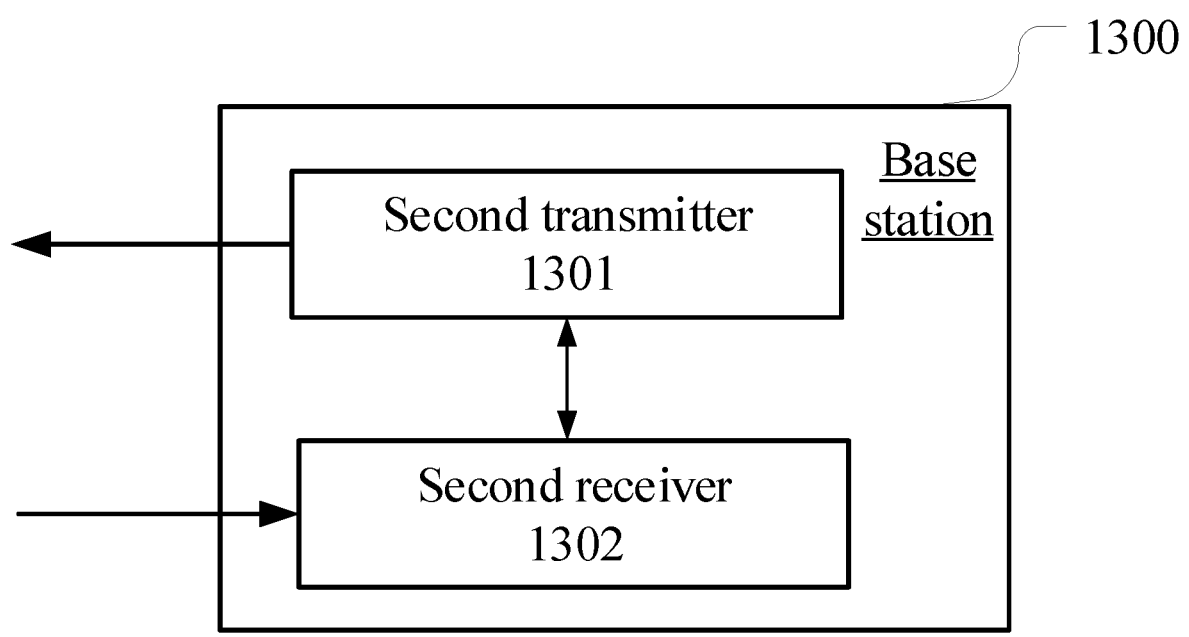
FIG. 18 illustrates a structure block diagram of a processing device in a base station according to one embodiment of the present disclosure.

Embodiment 18 illustrates a structure block diagram of a processing device in a base station, as shown in FIG. 18. In FIG. 18, a base station's processing device 1300 comprises a second transmitter 1301 and a second receiver 1302.

In one subembodiment, the second transmitter 1301 comprises the transmitter 416, the transmitting processor 415 and the controller/processor 440 in Embodiment 4.

In one subembodiment, the second transmitter 1301 comprises at least the first two of the transmitter 416, the transmitting processor 415 and the controller/processor 440 in Embodiment 4.

In one subembodiment, the second receiver 1302 comprises the receiver 416, the receiving processor 412 and the controller/processor 440 in Embodiment 4.

In one subembodiment, the second receiver 1302 comprises at least the first two of the receiver 416, the receiving processor 412 and the controller/processor 440 in Embodiment 4.

The second transmitter 1301 transmits first information, the first information being used to indicate a first time-domain resource and a second time-domain resource in a first sub-band, wherein the first time-domain resource is reserved for a first radio signal, and the second time-domain resource is reserved for a second radio signal.

The second receiver 1302 monitors the first radio signal on the first time-domain resource in the first sub-band to determine whether the first radio signal is transmitted on the first time-domain resource in the first sub-band; receives the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and the second receiver 1302 receives a first target radio signal on the reserved time-domain resource in the first sub-band.

In Embodiment 18, a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

In one embodiment, the second receiver 1302 also monitors the first target radio signal on the reserved time-domain resource in the first sub-band to determine whether the first target radio signal is transmitted on the reserved time-domain resource in the first sub-band; herein, a first target access detection performed is used to determine whether to transmit the first target radio signal on the reserved time-domain resource in the first sub-band, and an end time of the first target access detection is earlier than a start time of the reserved time-domain resource.

In one embodiment, the second receiver 1302 also monitors the second radio signal on the second time-domain resource in the first sub-band to determine whether the second radio signal is transmitted on the second time-domain resource in the first sub-band; when the second radio signal is transmitted on the second time-domain resource in the first sub-band, the second receiver also receives the second radio signal on the second time-domain resource in the first sub-band.

In one embodiment, the second receiver 1302 also receives a second target radio signal on the first time-domain resource in the first sub-band; wherein the first time-domain resource is earlier than the second time-domain resource, the first radio signal is transmitted on the first time-domain resource in the first sub-band, the first target radio signal is transmitted on the reserved time-domain resource in the first sub-band, and the second radio signal is not transmitted on the second time-domain resource in the first sub-band.

In one embodiment, the second transmitter 1301 also transmits second information; herein, the second information is used to indicate configuration information of the first target radio signal.

In one embodiment, the second transmitter 1301 also transmits third information; wherein the third information is used to indicate configuration information of the second target radio signal.

In one embodiment, the second transmitter 1301 also transmits fourth information; wherein the fourth information is used to indicate configuration information of the first radio signal and configuration information of the second radio signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:
   receiving first information, the first information being used to indicate a first time-domain resource and a second time-domain resource in a first sub-band, wherein the first time-domain resource is reserved for a first radio signal, and the second time-domain resource is reserved for a second radio signal;
   performing a first access detection to determine whether to transmit the first radio signal on the first time-domain resource in the first sub-band; and
   transmitting the first radio signal on the first time-domain resource in the first sub-band, and not transmitting any radio signal on a reserved time-domain resource in the first sub-band; or, dropping transmission of the first radio signal on the first time-domain resource in the first sub-band, and transmitting a first target radio signal on the reserved time-domain resource in the first sub-band;
   wherein the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

2. The method according to claim 1, comprising:
   performing a first target access detection;
   wherein the first target access detection is used to determine whether to transmit the first target radio signal on the reserved time-domain resource in the first sub-band, and an end time of the first target access detection is earlier than a start time of the reserved time-domain resource.

3. The method according to claim 1, comprising: transmitting the second radio signal on the second time-domain resource in the first sub-band; or, dropping transmission of the second radio signal on the second time-domain resource in the first sub-band;
or, comprising: receiving second information; wherein the second information is used to indicate configuration information of the first target radio signal;
or, comprising: receiving fourth information; wherein the fourth information is used to indicate configuration information of the first radio signal and configuration information of the second radio signal.

4. The method according to claim 1, comprising:
transmitting a second target radio signal on the first time-domain resource in the first sub-band; and
dropping transmission of the second radio signal on the second time-domain resource in the first sub-band;
wherein the first time-domain resource is earlier than the second time-domain resource, the UE drops transmitting the first radio signal on the first time-domain resource in the first sub-band, and transmits the first target radio signal on the reserved time-domain resource in the first sub-band.

5. The method according to claim 4, comprising:
receiving third information;
wherein the third information is used to indicate configuration information of the second target radio signal.

6. A method in a base station for wireless communications, comprising:
transmitting first information, the first information being used to indicate a first time-domain resource and a second time-domain resource in a first sub-band, wherein the first time-domain resource is reserved for a first radio signal, and the second time-domain resource is reserved for a second radio signal;
monitoring the first radio signal on the first time-domain resource in the first sub-band to determine whether the first radio signal is transmitted on the first time-domain resource in the first sub-band; and
receiving the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and receiving a first target radio signal on the reserved time-domain resource in the first sub-band;
wherein a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

7. The method according to claim 6, comprising:
monitoring the first target radio signal on the reserved time-domain resource in the first sub-band to determine whether the first target radio signal is transmitted on the reserved time-domain resource in the first sub-band;
wherein a first target access detection is used to determine whether to transmit the first target radio signal on the reserved time-domain resource in the first sub-band, and an end time of the first target access detection is earlier than a start time of the reserved time-domain resource.

8. The method according to claim 6, comprising: monitoring the second radio signal on the second time-domain resource in the first sub-band to determine whether the second radio signal is transmitted on the second time-domain resource in the first sub-band; when the second radio signal is transmitted on the second time-domain resource in the first sub-band, the second radio signal is received on the second time-domain resource in the first sub-band;
or, transmitting second information; wherein the second information is used to indicate configuration information of the first target radio signal;
or, transmitting fourth information; wherein the fourth information is used to indicate configuration information of the first radio signal and configuration information of the second radio signal.

9. The method according to claim 6, comprising:
receiving a second target radio signal on the first time-domain resource in the first sub-band;
wherein the first time-domain resource is earlier than the second time-domain resource, the first radio signal is transmitted on the first time-domain resource in the first sub-band, the first target radio signal is transmitted on the reserved time-domain resource in the first sub-band, and the second radio signal is not transmitted on the second time-domain resource in the first sub-band.

10. The method according to claim 9, comprising:
transmitting third information;
wherein the third information is used to indicate configuration information of the second target radio signal.

11. A User Equipment (UE) for wireless communications, comprising:
a first receiver, which receives first information, the first information being used to indicate a first time-domain resource and a second time-domain resource in a first sub-band, wherein the first time-domain resource is reserved for a first radio signal, and the second time-domain resource is reserved for a second radio signal;
a first transceiver, which performs a first access detection to determine whether to transmit the first radio signal on the first time-domain resource in the first sub-band; and which transmits the first radio signal on the first time-domain resource in the first sub-band, and does not transmit any radio signal on a reserved time-domain resource in the first sub-band; or, which drops transmitting the first radio signal on the first time-domain resource in the first sub-band, and transmits a first target radio signal on the reserved time-domain resource in the first sub-band;
wherein the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

12. The UE according to claim 11, wherein the first transceiver also performs a first target access detection; wherein the first target access detection is used to determine whether to transmit the first target radio signal on the reserved time-domain resource in the first sub-band, and an end time of the first target access detection is earlier than a start time of the reserved time-domain resource.

13. The UE according to claim 11, wherein the first transceiver also transmits the second radio signal on the second time-domain resource in the first sub-band; or, drops transmitting the second radio signal on the second time-domain resource in the first sub-band;
   or, the first receiver also receives second information; wherein the second information is used to indicate configuration information of the first target radio signal;
   or, the first receiver also receives fourth information; wherein the fourth information is used to indicate configuration information of the first radio signal and configuration information of the second radio signal.

14. The UE according to claim 11, wherein the first transceiver also transmits a second target radio signal on the first time-domain resource in the first sub-band; and drops transmitting the second radio signal on the second time-domain resource in the first sub-band; wherein the first time-domain resource is earlier than the second time-domain resource, the UE drops transmitting the first radio signal on the first time-domain resource in the first sub-band, and transmits the first target radio signal on the reserved time-domain resource in the first sub-band.

15. The UE according to claim 14, wherein the first receiver also receives third information; wherein the third information is used to indicate configuration information of the second target radio signal.

16. A base station for wireless communications, comprising:
   a second transmitter, which transmits first information, the first information being used to indicate a first time-domain resource and a second time-domain resource in a first sub-band, wherein the first time-domain resource is reserved for a first radio signal, and the second time-domain resource is reserved for a second radio signal;
   a second receiver, which monitors the first radio signal on the first time-domain resource in the first sub-band to determine whether the first radio signal is transmitted on the first time-domain resource in the first sub-band; and receives the first radio signal on the first time-domain resource in the first sub-band, while a transmitter of the first radio signal does not transmit any radio signal on a reserved time-domain resource in the first sub-band; or, the first radio signal is not transmitted on the first time-domain resource in the first sub-band, and which receives a first target radio signal on the reserved time-domain resource in the first sub-band;
   wherein a first access detection performed is used to determine whether to transmit the first radio signal on the first time-domain resource in the first sub-band; the first time-domain resource, the second time-domain resource and the reserved time-domain resource are mutually orthogonal in time domain, and the reserved time-domain resource is located between the first time-domain resource and the second time-domain resource in time domain; the first time-domain resource is composed of a positive integer number of multicarrier symbol(s), the second time-domain resource is composed of a positive integer number of multicarrier symbol(s), and the reserved time-domain resource is composed of a positive integer number of multicarrier symbol(s).

17. The base station according to claim 16, wherein the second receiver also monitors the first target radio signal on the reserved time-domain resource in the first sub-band to determine whether the first target radio signal is transmitted on the reserved time-domain resource in the first sub-band; wherein a first target access detection is used to determine whether to transmit the first target radio signal on the reserved time-domain resource in the first sub-band, and an end time of the first target access detection is earlier than a start time of the reserved time-domain resource.

18. The base station according to claim 16, wherein the second receiver also monitors the second radio signal on the second time-domain resource in the first sub-band to determine whether the second radio signal is transmitted on the second time-domain resource in the first sub-band; when the second radio signal is transmitted on the second time-domain resource in the first sub-band, the second receiver also receives the second radio signal on the second time-domain resource in the first sub-band;
   or, the second transmitter also transmits second information; wherein the second information is used to indicate configuration information of the first target radio signal;
   or, the second transmitter also transmits fourth information; wherein the fourth information is used to indicate configuration information of the first radio signal and configuration information of the second radio signal.

19. The base station according to claim 16, wherein the second receiver also receives a second target radio signal on the first time-domain resource in the first sub-band; wherein the first time-domain resource is earlier than the second time-domain resource, the first radio signal is transmitted on the first time-domain resource in the first sub-band, the first target radio signal is transmitted on the reserved time-domain resource in the first sub-band, and the second radio signal is not transmitted on the second time-domain resource in the first sub-band.

20. The base station according to claim 19, wherein the second transmitter also transmits third information; wherein the third information is used to indicate configuration information of the second target radio signal.

* * * * *